US012782109B2

(12) United States Patent
Munro et al.

(10) Patent No.: US 12,782,109 B2
(45) Date of Patent: Nov. 3, 2026

(54) REFLECTIVE CO-AXIAL INTERFEROMETER SYSTEMS AND METHODS THEREOF

(71) Applicant: OptiPro Systems, LLC, Ontario, NY (US)

(72) Inventors: James F. Munro, Ontario, NY (US); Robert D. Niederriter, Albany, CA (US)

(73) Assignee: Munro Design & Technologies, LLC, Ontario, NY (US)

( * ) Notice: Subject to any disclaimer, the term of this patent is extended or adjusted under 35 U.S.C. 154(b) by 116 days.

(21) Appl. No.: 18/748,704

(22) Filed: Jun. 20, 2024

(65) Prior Publication Data

US 2024/0426594 A1 Dec. 26, 2024

Related U.S. Application Data

(60) Provisional application No. 63/522,023, filed on Jun. 20, 2023.

(51) Int. Cl.
*G01B 9/02* (2022.01)
*G01B 9/02015* (2022.01)
*G01B 9/02055* (2022.01)

(52) U.S. Cl.
CPC ..... *G01B 9/02074* (2013.01); *G01B 9/02029* (2013.01); *G01B 9/02049* (2013.01); *G01B 9/02075* (2013.01)

(58) Field of Classification Search
CPC ............ G01B 9/02074; G01B 9/02029; G01B 9/02049; G01B 9/02075; G01B 9/02057
See application file for complete search history.

(56) References Cited

U.S. PATENT DOCUMENTS

2012/0026581 A1* 2/2012 Comstock, II ......... G02B 7/022 156/60
2013/0048214 A1* 2/2013 Kalkowski ................. C09J 5/02 427/164

(Continued)

FOREIGN PATENT DOCUMENTS

DE 102011000213 A1 * 7/2012 ......... G02B 21/0016
WO WO-2021163143 A1 * 8/2021 ......... G01B 11/2441

OTHER PUBLICATIONS

International Search Report and the Written Opinion of the International Searching Authority Dated Sep. 17, 2024. International Application No. PCT/US2024/034774.

*Primary Examiner* — Michael A Lyons
*Assistant Examiner* — Mohamed Doumbia
(74) *Attorney, Agent, or Firm* — Troutman Pepper Locke LLP

(57) ABSTRACT

An interferometer system for measuring the displacement of a location of a test surface includes a reference arm comprising two reflective optical elements with optical power, a measurement arm comprising two reflective optical elements with optical power wherein one of the optical elements of the reference arm is one of the optical elements of the measurement arm. A housing can be provided in which the reflective optical elements are mounted, all such components made from a material having a low CTE. Further, spider support structures can be provided for positioning a reflective optical element within the housing, and/or for positioning a fiber optic device within the system. Light detecting elements can be installed on a side of a spider support structure facing the test surface and used to detect a tilt of the test surface which can be used to improve the accuracy of the displacement measurement.

30 Claims, 20 Drawing Sheets

(56) References Cited

U.S. PATENT DOCUMENTS

| | | | |
|---|---|---|---|
| 2015/0185324 A1 | 7/2015 | Cooper et al. | |
| 2020/0378743 A1* | 12/2020 | Körner ............... | G01B 9/02091 |
| 2021/0164894 A1* | 6/2021 | Prater .................... | G01N 21/35 |
| 2021/0172722 A1* | 6/2021 | Liu .................... | G01B 9/02022 |

* cited by examiner

| Surface | Description | Distance from S1 | RofC | Conic | Aperture Radius |
|---|---|---|---|---|---|
| S0 | Test Surface | -75.00 mm | -- | -- | -- |
| S1 | Secondary Mirror | 0.000 mm | 9.070 mm | 0.0 | 4.0 mm |
| S2 | Primary Mirror | 26.00 mm | 44.765 mm | -0.2383 | 14.1 mm |
| S3 | Reference Mirror | 126.00 mm | 128.843 mm | 0.0091 | 24.0 mm |
| S4 | Fiber Optic | 25.00 mm | Inf | -- | 0.0025mm |

Figure 9

| Surface | Description | Distance from S1 | RofC | Conic | Aperture Radius |
|---|---|---|---|---|---|
| S0 | Test Surface | -48.181 mm | -- | -- | -- |
| S1 | Secondary Mirror | 0.000 mm | 30.009 mm | 0.0 | 5.05 mm |
| S2 | Primary Mirror | 36.159 mm | 62.623 mm | 0.00759 | 22.5 mm |
| S3 | Reference Mirror | 120.00 mm | 133.642 mm | 0.02848 | 23.0 mm |
| S4 | Fiber Optic | 150.00 mm | Inf | -- | 0.0025mm |

Figure 17

REFLECTIVE CO-AXIAL INTERFEROMETER SYSTEMS AND METHODS THEREOF

This application claims the benefit of U.S. Provisional Patent Application Ser. No. 63/522,023, filed Jun. 20, 2023, which is hereby incorporated by reference in its entirety

FIELD

This technology generally relates to systems and methods for interferometrically measuring the displacement of a surface with high accuracy even when the surface is sloped or tilted.

BACKGROUND

Areal surface interferometry, including areal phase-measuring interferometry, has been used to measure the shape or form of optical surfaces for several decades. While generally quite fast and accurate, prior art areal surface interferometry suffers from errors—such as retrace errors, errors associated with non-ideal phase shifting, errors caused by the environment including temperature gradients, pressure gradients, humidity gradients, and even CO2 gradients, errors arising from uncertainties associated with the wavelength of the measurement light, errors caused by vibration, and errors caused by electron, photon, and detection noise—and also introduces unexpected costs and complexities in the surface metrology process.

Further, areal interferometers often depend on test spheres and null correctors, and an error in their fabrication or installation can result in later errors in the surface topography measurement results. In this example, the infamous surface errors in the primary mirror of the Hubble Space Telescope have been traced to problems with a null corrector. Since that time NASA—and associated manufacturers of large optics—have been seeking non-areal yet non-contact approaches for high-precision surface metrology. Generally, these approaches have entailed the use of an optical probe system that measures displacement of a surface at a given location, and the probe is then scanned across the surface of interest to generate a complete topographic profile of the surface of the optic.

One such prior art displacement measuring device is the spectral interferometric probe 10 shown in FIG. 1. The spectral interferometric probe 10 has a broadband light source 12 that emits light that is subsequently collimated by collimating lens 14 which then enters a beamsplitter 16. The beamsplitter 16 reflects a portion of the collimated light beam causing a portion of the collimated light beam to enter a chromatic lens 28 that focuses the light in such a way that its focal position along an optical axis 18 varies with wavelength. This converging chromatic light then strikes a second beamsplitter 30 which further divides the beam into a reference beam, shown reflecting to the left in FIG. 1 towards a reference mirror 24, and a measurement beam shown propagating downward through the second beamsplitter 30 towards a test surface 32. Note that the chromatic lens 28, the second beamsplitter 30, and the reference mirror 24 are located within the measurement head 20, which in turn is coupled to a linear piezo-electric transducer stage 22. The linear piezo-electric transducer stage 22 can cause the measurement head 20, and its internal constituents, to move along the optical axis 18 closer to or further away from the test surface 32. Light reflected from the reference mirror 24 and the test surface 32 (at measurement spot 26) both reflect back to the second beamsplitter 30 and then both re-enter the chromatic lens 28 which then re-collimates the two light beams.

The two re-collimated light beams then pass through the beamsplitter 16, enter the focusing lens 40, and then enter the spectrograph 42 through a small aperture at the focal point of the focusing lens 40. The two re-collimated beams then form a spectral interference pattern on the image sensor of the camera 44 associated with the spectrograph 42. The resulting spectral interference fringe pattern has several inflection points and high-slope regions for improved downstream processing and fitting by the digital processor 46.

Under these conditions, the displacement can be found quite accurately, to less than a nanometer, and is a particular strength of the spectral interferometric probe 10. A second strength is that if the measurement light reflected from the test surface 32 is weak (perhaps because the test surface 32 is highly polished and slightly tilted) then the interferometric gain present in the interference pattern provides a means of intensifying the weak optical signal so that it is of sufficient brightness to be image-able by the spectrograph 42 and to be processed by the digital processor 46.

Unfortunately, a serious drawback of the spectral interferometric probe 10 is that the optical path lengths of the reference arm and the measurement arm in this example are substantially unequal in order to obtain interference fringes at the image sensor of the camera 44. Since the optical path length, or equivalently the displacement, associated with the test surface 32 is unknown, then the position of the reference mirror 24 in this example is scanned, or equivalently, the reference arm is not scanned and instead the whole measurement head 20 is scanned by virtue of PZT 22 until a scanning position is found that produces the desired interference fringes in spectrograph 42. This scanning process requires a significant amount of time and limits the measurement throughput rate of spectral interferometer probe 10 to about 100 displacement measurement per second.

An additional limitation of interferometric probe 10 is the inability to measure the topography of surfaces that are sloped more than a few degrees with respect to the optical axis 18 of the interferometric probe 10. Light reflected from such a tilted test surface will not propagate back through the optical train of interferometric probe 10 and enter the spectrograph 42 and therefore will not produce optical signals that can be analyzed and therefore a displacement to test surface 32 cannot be determined.

SUMMARY

An interferometer comprises an optical axis, a reference arm comprising at least a concave mirror substantially centered on the optical axis, a measurement arm comprising at least a concave mirror substantially centered on the optical axis, a test surface, an input/output arm comprising a fiber optic substantially centered on the optical axis, a convex mirror substantially centered on the optical axis, and a plurality of light detecting devices. The convex mirror is configured to receive diverging light from the fiber optic of the input/output arm and reflect a portion of that light into the measurement arm in a manner such that light reflected from the concave mirror of the measurement arm is brought to a focus at the surface under test. Light reflected from the test surface is incident upon the concave mirror of the measurement arm which directs the light to the convex mirror which in turn reflects and focuses the measurement light onto the fiber optic of the input/output arm of the interferometer. The convex mirror is also configured to receive diverging light from the fiber optic of the input/output arm and reflect a portion of that light into the reference arm in a manner such that light reflected from the concave mirror of the reference arm is reflected again from the convex mirror and brought to a focus at the fiber optic of the input/output arm. The interferometer can also comprise a spider or other support structure that mounts and locates the fiber optic of the input/output arm in place with respect to the location of the other optical elements of the interferometer. The interferometer can also comprise a spider or other support structure that mounts and locates the convex mirror in place with respect to the location of the other optical elements of the interferometer. Further, light detectors can be installed on one or more arms of the support structure and configured to detect a tilt of the test surface with respect to the optical axis.

An interferometer system comprising the afore-described interferometer, a broadband light source, a fiber optic light delivery system that transports light from the broadband light source to the interferometer, a spectrometer that detects and spectrally disperses light output by the interferometer, a fiber optic light delivery system that transports light from the interferometer to the spectrometer, an electronic camera that captures images of the spectral interferogram produced by the spectrometer, a data acquisition sub-system that collects light intensity data from the tilt-detecting light detectors, and a digital processing system that processes the spectral interferogram and the acquired tilt data to compute a highly accurate distance measurement to the test surface.

Accordingly, examples of the claimed technology provide a number of advantages including measurement operations that do not require the mechanical movement of a reference mirror or an interferometer head to perform a displacement measurement such that the measurement system has a fast displacement measurement rate, as well as the high accuracy of an interferometric probe even when the surface being measured is sloped or tilted.

BRIEF DESCRIPTION OF THE DRAWINGS

FIG. 9 is a table of prescription data of the optical elements of a first example of an interferometer in accordance with embodiments of the present invention;

FIG. 17 is a table of prescription data of the optical elements of a second example of an interferometer in accordance with embodiments of the present invention;

DETAILED DESCRIPTION

Example 1

Figure 1:
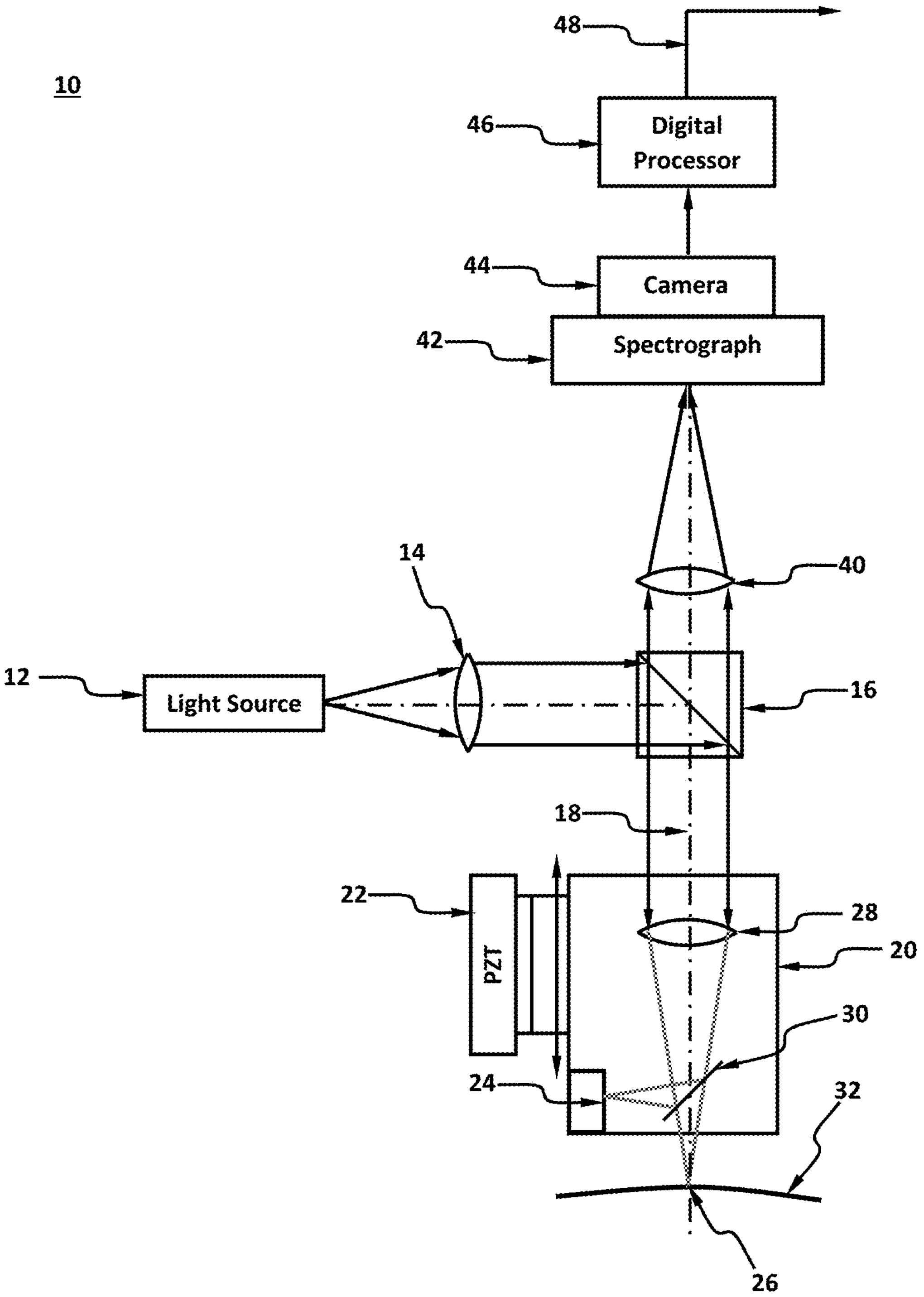
Figure 1 (Prior Art)
FIG. 1 is a block diagram of a prior art confocal interferometric displacement measuring system.
Figure 2:
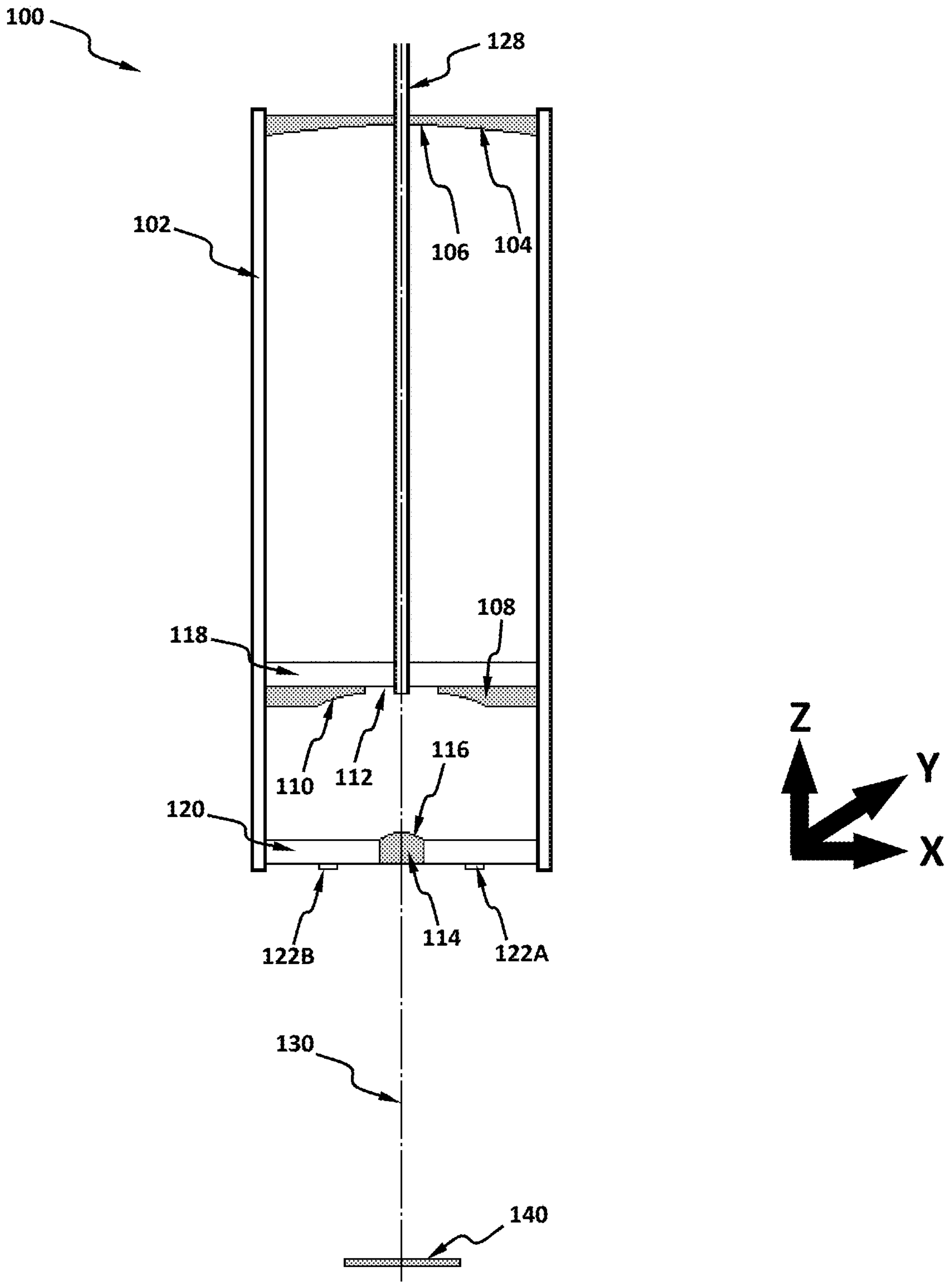
FIG. 2 is a side-view diagram illustrating the optical elements of a first example of an interferometer in accordance with embodiments of the present invention.
Figure 3:
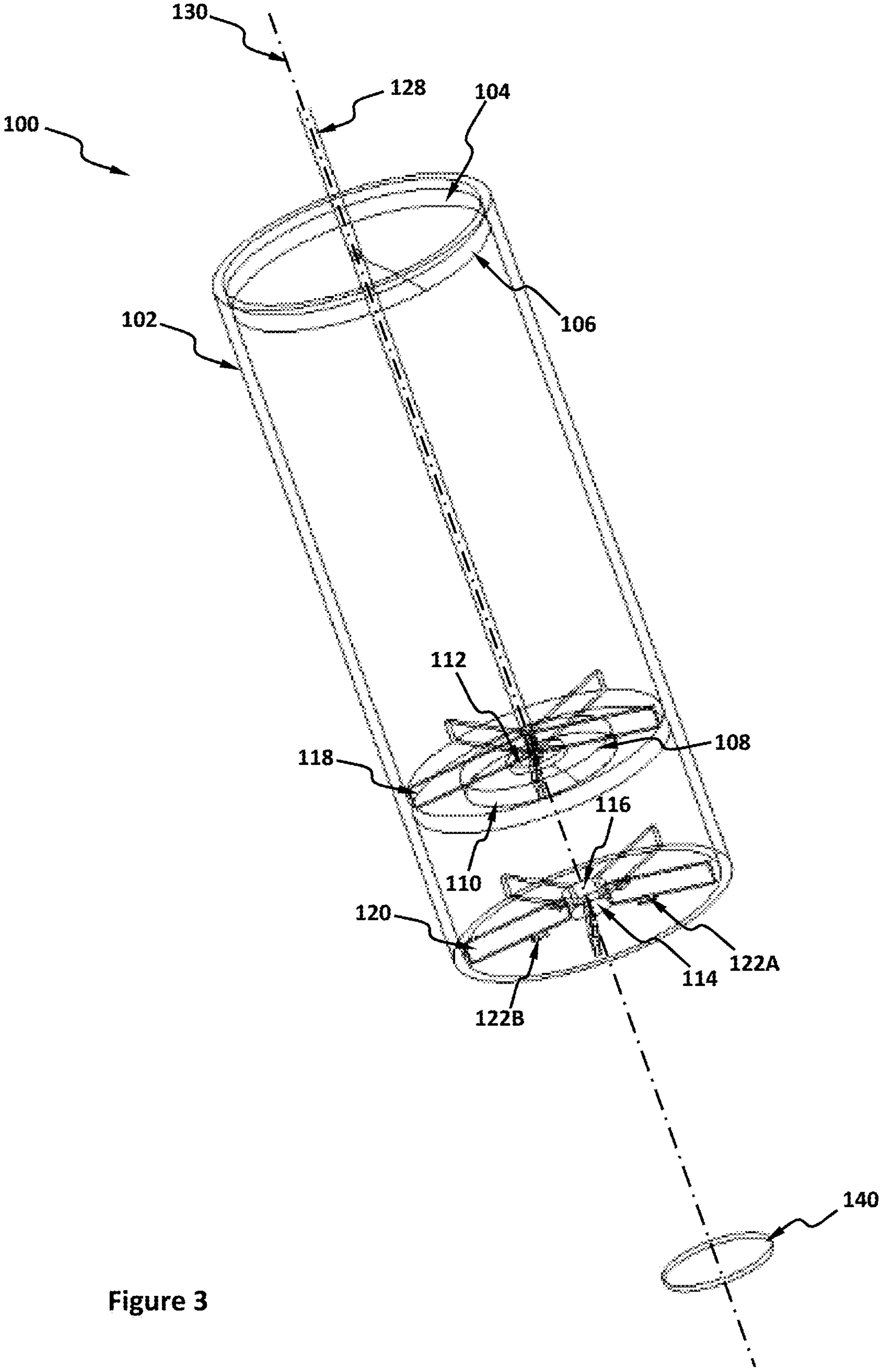
FIG. 3 is an oblique-view diagram illustrating the optical elements of a first example of an interferometer in accordance with embodiments of the present invention.

An interferometer 100 in accordance with examples of the claimed technology is illustrated in FIGS. 2 and 3. In this example, the interferometer 100 comprises a housing 102, a reference mirror 104 having a reference mirror surface 106, a primary mirror 108 having a primary mirror surface 110, a secondary mirror 114 having a secondary mirror surface 116 at least partially held in place by secondary spider support structure 120, an input/output optical fiber 128 at least partially held in place by fiber spider support structure 118, a test surface 140, and a plurality of photodetectors 122A through 122E affixed to lower edges of secondary spider support structure 120, although interferometer 100 may have other types and/or numbers of other components and/or other elements in other configurations. Interferometer

100 can also include an optical axis 130 that substantially passes through the center(s) of the reflective optical components of interferometer 100 and also substantially passes through the center of the envelope of light bundles propagating through interferometer 100 when the test surface 140 is orthogonal to the optical axis 130.

Figure 8:
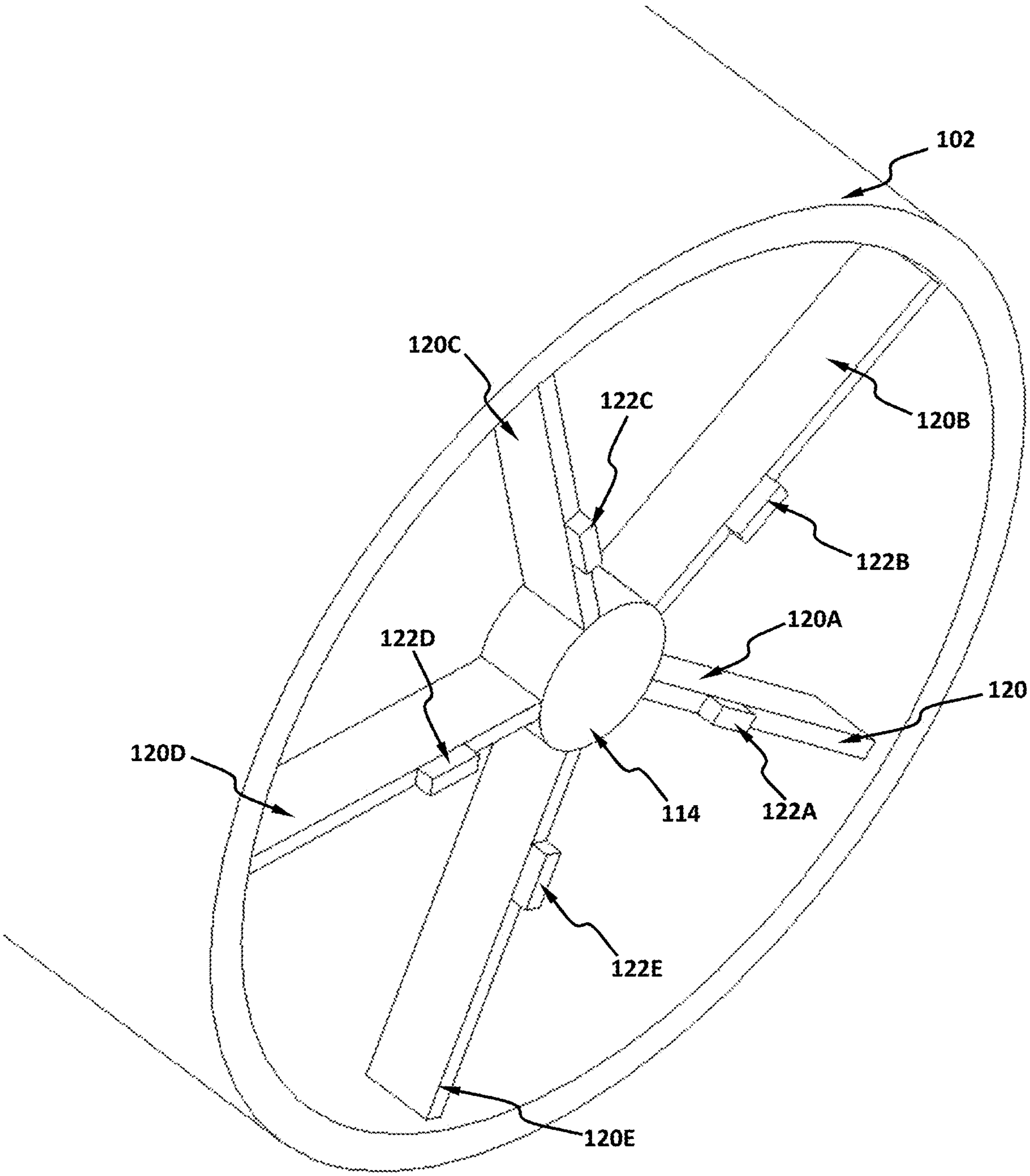
FIG. 8 is an enlarged oblique-view diagram illustrating the primary spider support structure and light detectors of a first example of an interferometer in accordance with embodiments of the present invention.

Continuing with reference to FIGS. 2, 3, and 8, housing 102 can be a hollowed rigid component in which the optical elements of interferometer 100 are directly or indirectly mounted. In this example, housing 102 preferably has a cylindrical outer surface substantially centered on optical axis 130 and a cylindrical inner surface also substantially centered on optical axis 130. Accordingly, the cross-sectional shape of the outer and inner surfaces of housing 102 are substantially circular, although they can have other shapes, such as for example elliptical or polygonal. In this example, an inner width of housing 102 can be between 8 mm and 200 mm, an outer width of housing 102 can be between 10 mm and 250 mm, and the wall thickness (i.e., the difference between the half-widths of an outer surface and an inner surface) of housing 102 can be between 1 mm and 50 mm. In this example, the length of housing 102 can be between 25 mm and 1000 mm but is preferably less than 100 mm. Housing 102 can be produced with additive or subtractive fabrication processes and in this example is preferably composed of a material having a low CTE (coefficient of thermal expansion) such as Invar, Zerodur, or ULE. Further, in this example housing 102 is most preferably composed of the same material that reference mirror 104 is composed of so their CTE's match; similarly housing 102 is preferably composed of the same material that primary mirror 108 and secondary mirror 114 are also composed of, although other types and/or combinations of materials can be used. As seen in FIGS. 2 and 3, reference mirror 104, secondary spider support structure 120, and fiber spider support structure 118 can be directly coupled to housing 102, and housing 102 can be provided with mechanical features, such as notches, flats, or locating fiducials, to facilitate the coupling. Housing 102 can also have features machined into one or more of its surfaces to facilitate locating, placement, or mounting of the components, such as primary mirror 108, reference mirror 104, or for adjusting or aligning these components while interferometer 100 is being assembled. Housing 102 can also have features or provisions to facilitate the mounting or attachment of interferometer 100 into a metrology or positioning system such as a CMM (coordinate measurement machine).

Continuing with reference to FIGS. 2 and 3, reference mirror 104 is an optical element having a reflective reference mirror surface 106. Reference mirror 104 can be mechanically coupled to housing 102 and therefore an outer diameter of reference mirror 104 can be substantially the same as an inner diameter of housing 102. In this example, the substrate of reference mirror 104 is preferably composed of a material having a low CTE such as Invar, Zerodur, or ULE. In this example, the edge thickness of reference mirror 104 can be between 1 mm and 20 mm, and reference mirror surface 106 can be a concave surface having a spherical, aspherical, parabolic, hyperbolic, or even an elliptical prescription, and preferably is centered on optical axis 130 and has rotational symmetry about optical axis 130. Reference mirror 104 has a central hole substantially centered on optical axis 130 through which input/output optical fiber 128 passes. The width of the central hole can be between 0.1 mm and 3.0 mm. In this example, the peak-to-valley (P-V) surface error of reference surface mirror 106 can be less than 1.0 micrometers within the clear aperture of reference mirror surface 106 but preferably has P-V surface error less than 0.5 micrometers or more preferably less than 0.1 micrometers. In this example, reference mirror surface 106 is preferably a mirror that is reflective to the wavelengths of light utilized by interferometer 100 and has a reflectivity to these wavelengths of greater than 80%, or preferably greater than 90%, or more preferably greater than 96%, although the reflectivity of reference mirror surface 106 can be substantially the same as the reflectivity of test surface 140. The reflective layer on reference mirror surface 106 can in this example comprise a metal, such as aluminum or silver, or be composed of a stack of dielectric thin films, or reference mirror surface 106 can operate without benefit of a reflective layer. Note that reference mirror 104 in conjunction with secondary mirror 114 form the reference arm of interferometer 100. Reference mirror 104 can also have features machined into one or more of its surfaces to facilitate locating, adjusting, aligning, or mounting of the reference mirror 104 to housing 102 and/or with respect to other optical or non-optical component of interferometer 100.

Figure 6:
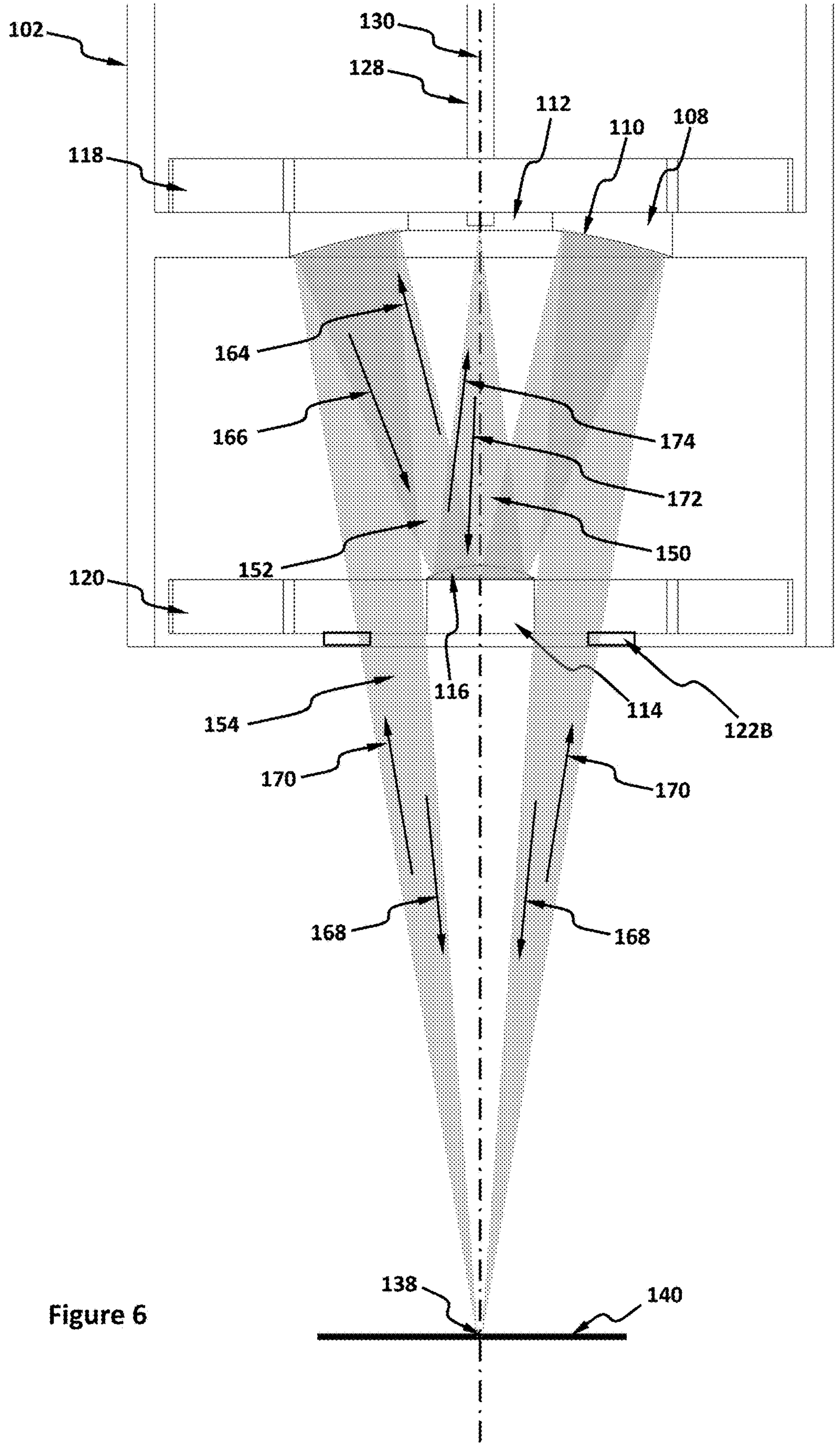
FIG. 6 is an enlarged side-view diagram illustrating the optical elements and light paths of a measurement arm of a first example of an interferometer in accordance with embodiments of the present invention.
Figure 7:
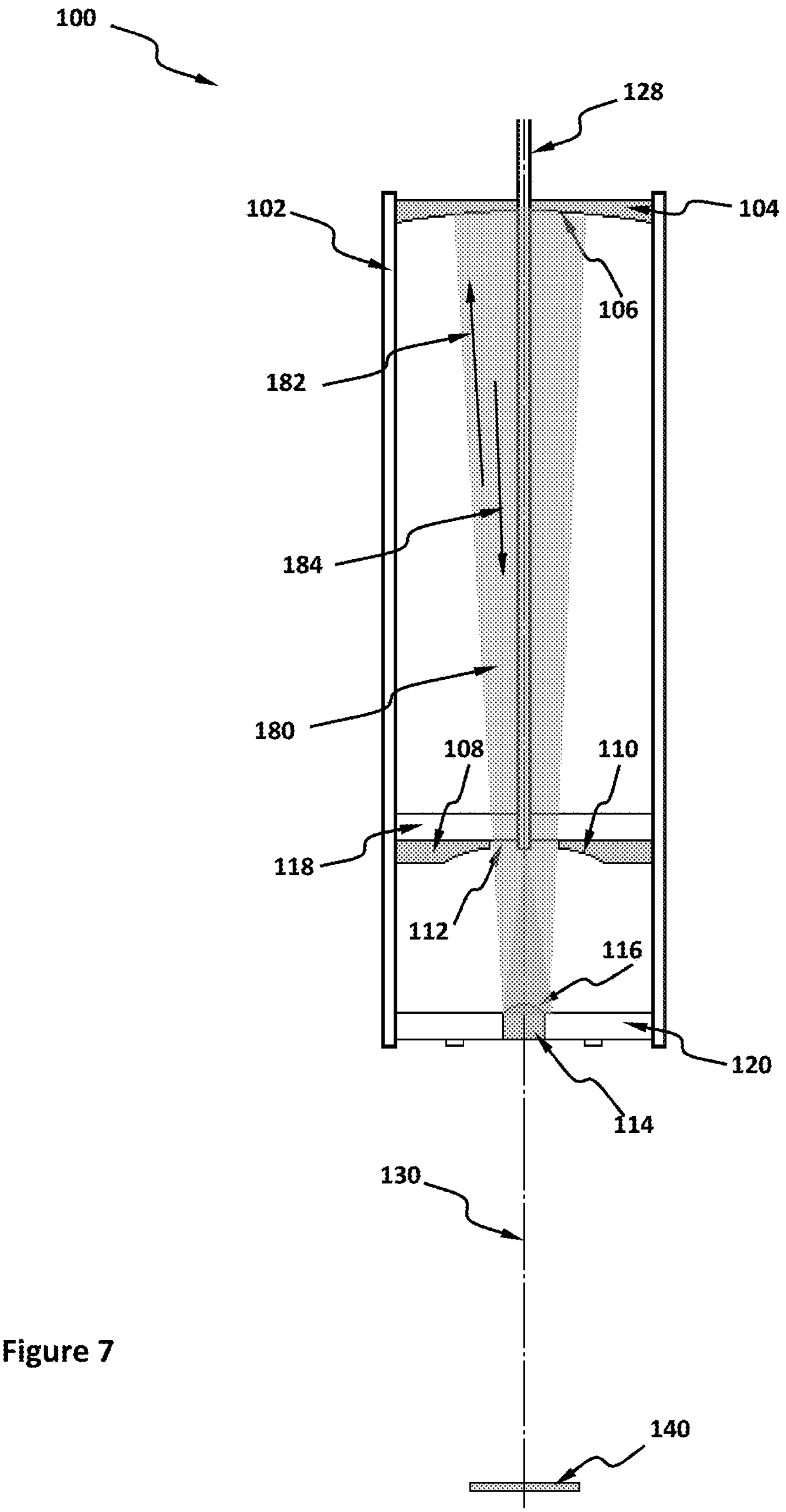
FIG. 7 is a side-view diagram illustrating the optical elements and light paths of a reference arm of a first example of an interferometer in accordance with embodiments of the present invention.

Continuing with reference to FIGS. 2 and 3, primary mirror 108 is an optical element having a reflective primary mirror surface 110. In this example, primary mirror 108 can be mechanically coupled to fiber spider support structure 118 which in turn is mechanically coupled to housing 102, or preferably primary mirror 108 can be coupled directly with housing 102 such that primary mirror 108 is held rigidly in position with respect to housing 102, reference mirror 104 and secondary mirror 114. The outer diameter of primary mirror 108 can be between 6 mm and 100 mm. In this example, the substrate of primary mirror 108 is preferably composed of a material having a low CTE such as Invar, Zerodur, or ULE. In this example, the edge thickness of primary mirror 108 can be between 1 mm and 20 mm, and primary mirror surface 110 can be a concave surface having a spherical, aspherical, parabolic, hyperbolic, or even an elliptical prescription, and preferably is centered on optical axis 130 and has rotational symmetry about optical axis 130. Primary mirror 108 has a central hole or aperture 112 substantially centered on optical axis 130 through which input/output optical fiber 128 passes, or through which exiting fiber light 172 (as shown in FIG. 6) from input/output optical fiber 128 passes, or through which entering fiber light 174 passes. Also, aperture 112 must be of sufficient width to allow reference light 182 and reflected reference light 184 to pass as shown in FIG. 7. The width of aperture 112 can be between 1.0 mm and 50.0 mm. In this example, the peak-to-valley surface error of primary mirror surface 110 can be less than 1.0 micrometers within the clear aperture of primary mirror surface 110 but preferably has P-V surface error less than 0.5 micrometers or more preferably less than 0.1 micrometers. In this example, the primary mirror surface 110 is preferably a mirror that is reflective to the wavelengths of light utilized by interferometer 100 and has a reflectivity to these wavelengths of greater than 80%, or preferably greater than 90%, or more preferably greater than 96%. The reflective layer on primary mirror surface 110 can in this example comprise a metal, such as aluminum or silver, or be composed of a stack of dielectric thin films. Note that primary mirror 108 in conjunction with secondary mirror 114 form the measurement arm of interferometer 100. Primary mirror 108 can also have features machined into one or more of its surfaces to facilitate locating, adjusting, aligning, or mounting of the primary mirror 108 to housing 102 and/or with respect to other optical component of interferometer 100.

Continuing with reference to FIGS. 2 and 3, secondary mirror 114 is an optical element having a reflective secondary mirror surface 116. Secondary mirror 114 can be mechanically coupled to secondary spider support structure 120 which in turn is mechanically coupled to housing 102 such that secondary mirror 114 is held rigidly in position with respect to housing 102, reference mirror 104 and primary mirror 108. The outer diameter of secondary mirror 114 can be between 2 mm and 50 mm. In this example, the substrate of secondary mirror 114 is preferably composed of a material having a low CTE such as Invar, Zerodur, or ULE. The center thickness of secondary mirror 114 can be between 1 mm and 20 mm, and secondary mirror surface 116 can be a convex surface having a preferably spherical prescription, although aspherical, parabolic, hyperbolic, or even an elliptical prescription is possible as well. In this example, the secondary mirror surface 116 is also preferably centered on optical axis 130 and has rotational symmetry about optical axis 130. In this example, the peak-to-valley surface error of secondary mirror surface 116 can be less than 1.0 micrometers within the clear aperture of secondary mirror surface 116 but preferably has P-V surface error less than 0.5 micrometers or more preferably less than 0.1 micrometers. In this example, the secondary mirror surface 116 is preferably a mirror that is reflective to the wavelengths of light utilized by interferometer 100 and has a reflectivity to these wavelengths of greater than 80%, or preferably greater than 90%, or more preferably greater than 96%. The reflective layer on secondary mirror surface 116 can in this example comprise a metal, such as aluminum or silver, or composed of a stack of dielectric thin films.

Fiber spider support structure 118 is a mechanical device comprising several arms emanating from a central lobe that is used to hold the input/output optical fiber 128 in place with respect to housing 102, reference mirror 104, primary mirror 108 and secondary mirror 114. Note that input/output optical fiber 128 can be installed in a hole in the central lobe of fiber spider support structure 118 that is substantially coaxial with optical axis 130, and the distal ends of the arms of fiber spider support structure 118 can in turn be coupled to housing 102. In this example, Fiber spider support structure 118 can have between two and ten arms (fiber spider support structure 118 shown in the figures have five arms), and fiber spider support structure 118 can be installed proximal to the rear-side of primary mirror 108 (i.e., not on the side of primary mirror 108 having primary mirror surface 110) so the arms of fiber spider support structure do not have the opportunity to block light incident onto—or reflected from—primary mirror surface 110). In this example, the fiber spider support structure 118 can comprise a polymer, glasseous, ceramic, or metallic material, but is preferentially composed of a material that is rigid and has a low CTE such as ULE, Zerodur, or Invar, and is even more preferentially composed of the same material that housing 102 is composed of. In this example, the arms of fiber spider support structure 118 can be thin so as to not block light propagating to or reflected from reference mirror 104, the width of the arms being less than 2.0 mm, or preferably less than 1.0 mm. The arms of fiber spider support structure 118 must be of sufficient length to reach the inner side-wall of housing 102.

Secondary spider support structure 120 is a mechanical device comprising of several arms emanating from a central lobe that is used to hold the secondary mirror 114 in place with respect to housing 102, input/out fiber 128, reference mirror 104, and primary mirror 108. Note that secondary mirror 114 can be installed in a hole or recess at or in the central lobe of secondary spider support structure 120 that is substantially coaxial with optical axis 130, and the distal ends of the arms of secondary spider support structure 120 are in turn coupled to housing 102. Secondary spider support structure 120 can have between two and ten arms (secondary mirror spider support structure 120 shown in the figures has five arms). In this example, preferably, secondary spider support structure 120 has the same number of arms as fiber spider support structure 118, the width of the arms of secondary spider support structure 120 is the same as the width of the fiber spider support structure 118, and the angular orientation of secondary spider support structure 120 about optical axis 130 is the same as the angular orientation of fiber spider support structure 118 about optical axis 130. In this example, secondary spider support structure 120 can comprise a polymer, glasseous, ceramic, or metallic material, but is preferentially composed of a material that is rigid and has a low CTE such as ULE, Zerodur, or Invar, and is even more preferentially composed of the same material that housing 102 is composed of. In this example, the arms of secondary spider support structure 120 can be thin so as to not block large amounts of light propagating to or reflected from primary mirror 108, the width of the arms being less than 2.0 mm, or preferably less than 1.0 mm. The arms of primary spider support structure 118 must be of sufficient length to reach the inner side-wall of housing 102.

Continuing with reference to FIGS. 2 and 3, and with particular reference to FIG. 8, an array of small photodetectors, such as photodetectors 122A through 122E, can be installed on the arms of secondary spider support structure 120, such as on secondary spider support structure arms 120A through 120E, on the side of the secondary spider support structure arms 120A through 120E that face test surface 140. Photodetectors, such as photodetectors 122A through 122E, can be used to detect a portion of the reflected test light 170 that is reflected from test surface 140 such that the tilt of test surface 140 with respect to optical axis 130 can be determined, as described below in connection to FIG. 18, so that the retrace errors—which are a strong function of test surface tilt—can be calibrated and removed from the measurements made by interferometer 100 and interferometer system 300. The number of photodetectors 122 can vary in accordance with the number of arms of secondary spider support structure 120 such that there is one photodetector, such as photodetector 122A, for each arm of secondary spider support structure 120, which can be between two and ten. Each photodetector 122 can be radially positioned on its respective arm of secondary spider support structure 120 between 1 mm and 50 mm from the optical axis 130, wherein the radial positioning is substantially the same for each photodetector 122. The width of photodetectors 122 can be the same as the width of the arms of secondary spider support structure 120, or thinner, such as less than 1.0 mm, to minimize the amount of reflected test light 170 that is blocked by photodetectors 122. The length of photodetectors 122 can be the same as the radial length of the arms of secondary spider support structure 120, or less than the lengths of the arms of secondary spider support structure 120. The length of photodetectors 122 can be between 0.5 mm and 50.0 mm, and further, there can be more than one photodetector mounted on an arm of secondary spider support structure 120. Photodetectors 122 can be photodiodes, PIN photodiodes, or even avalanche photodiodes, and can operate in either photovoltaic or photoconductive modes, and can comprise a semiconductor material such as Silicon, Germanium, GaAs, or InGaAs.

Input/output optical fiber 128 is an optical fiber through which is delivered into interferometer 100 broadband light from a broadband light source, and through which light exits from interferometer 100 and is delivered to an optical analyzer such as a spectrometer. In this example, the input/output optical fiber 128 can be a multi-mode fiber but is preferentially a single-mode fiber having a core 6 μm's or less in diameter. In this example, the outer diameter of the jacket of input/output optical fiber 128 can be less than or equal to 3.0 mm, but is preferentially less than 1.00 mm, or more preferentially less than 0.50 mm to minimize the amount of light propagating within interferometer 100 that is blocked by input/output optical fiber 128. In this example, the input/output optical fiber 128 is transmissive to those wavelengths of light that interferometer 100 uses such as from 500 nm to 600 nm, or more preferably from 450 nm to 700 nm, or even more preferably from 400 nm to 800 nm. A good candidate fiber for use as input/output optical fiber 128 is the SM450 fiber from Thorlabs (Newton, NJ, USA) which has an outer jacket or cladding diameter of 0.245 mm and is highly transmissive from 488 nm to 633 nm but nonetheless has adequate light transmissivity from 430 nm to 800 nm wavelengths for use with interferometer 100.

Test surface 140 is that surface that is provided by the user whose topography is to be measured by interferometer system 300 wherein the topographical data can comprise a series or an array of individual displacement measurements. The displacement can be defined as that distance along optical axis 130 from measurement spot 138 on test surface 140 to a suitable, yet somewhat arbitrary, point on optical axis 130 such as, for example, where optical axis 130 intersect the apex of secondary mirror surface 116 or, for example, where optical axis 130 intersects the aperture of input/output optical fiber 128. Since what is generally desired as an output from interferometer system 300 is the change in displacement as interferometer 100 is scanned over test surface 140, the actual displacement end-point within interferometer 100 is arbitrary, although it must not change during the scanning and measurement processes. Alternately, interferometer 100 with interferometer system 300 can compute optical path differences (OPD) between the reference arm of interferometer 100 and measurement arm of interferometer 100 in which case the OPD indicates changes in displacement (substantially equal to two times the changes displacement) as the interferometer is scanned in which case no end-point within interferometer 100 is utilized.

In operation, interferometer 100 is scanned or translated across test surface 140 in a linear, curved, piecewise-linear, or areal pattern such that interferometer 100 can measure the displacement to test surface 140 in more than one location so the relative displacement between the two or more locations can be determined. Test surface 140 is generally a surface of an article of manufacture such as an optical surface such as, for example, the surface of a mirror, a window, or a lens. Test surface 140 can be substantially planar, or curved such as spherical, aspherical, free-form, cylindrical, acylindrical, parabolic, or even elliptical in shape. Test surface 140 can have a width as small as 0.5 mm or a width of up to 5000 mm or more. Test surface 140 can have a sag, or a range of displacement, of from less than 2 nanometers up to 1000 millimeters. The perimeter shape of test surface 140 can be substantially circular, elliptical, square, rectangular, or polygonal. Test surface 140 can be reflective having a reflectivity (to a certain band of wavelengths) greater than 90%, or absorptive such that 90% or more of the light incident upon it (within a certain band of wavelengths) is absorbed, or transmissive in which more than 50% of the light incident upon it (within a certain band of wavelengths) passes through test surface 140. In this example, test surface 140 can be specularly reflective and accordingly be highly polished, or test surface 140 can have a slight texture and if textured the standard deviation of the width of the features of the texture is preferably less than half the width of measurement spot 138 on test surface 140. Finally test surface 140 can be substantially perpendicular to optical axis 130 at measurement spot 138 or test surface 140 can be tilted with respect to optical axis 130, the amount of tilt being less than 5°, or up to 10°, or even 20° or more, although greater amounts of tilt have corresponding less amounts of light throughput through the measurement arm of interferometer 100.

Interferometer 100, like most interferometers, can be described as having four arms: a source arm, a reference arm, a measurement arm, and an output arm, some of which overlap or even share the same components in interferometer 100. The source arm of interferometer 100 is that arm that sources light into interferometer 100 and includes input/output optical fiber 128 and secondary mirror surface 116. The reference arm of interferometer 100 is that arm that provides reference light to interfere with light from the measurement arm and includes secondary mirror surface 116 and reference mirror surface 106 of reference mirror 104. The measurement arm of interferometer 100 is that arm that provides measurement light to interfere with light from the reference arm and includes secondary mirror surface 116, primary mirror surface 110 of primary mirror 108, and test surface 140. The output arm of interferometer 100 is that arm that outputs light from interferometer 100 and includes input/output optical fiber 128 and secondary mirror surface 116 of secondary mirror 114.

The prescription of a first exemplary configuration of the optics of interferometer 100 is presented in FIG. 9. As seen in FIG. 9, there are five optical surfaces in the system including a secondary mirror surface (S1) 116 located at an elevation defined to be Z=0.000 mm, a test surface (S0) 140 with a nominal location 75.000 mm below S1, a primary mirror surface 110 (S2) 26.000 mm above S1, a reference mirror surface 106 (S3) 126.000 mm above S1, and an input/output aperture associated with input/output optical fiber 128 (S4) located 25.000 mm above S1. Also as seen in FIG. 9, the prescription includes a secondary mirror surface (S1) 116 that is spherical with a convex radius of curvature (RofC) of 9.070 mm and a clear aperture radius of 4.00 mm; a primary mirror surface (S2) 110 that is aspherical with a concave radius of curvature (RofC) of 44.765 mm with a conic constant of −0.2383 and a clear aperture radius of 14.10 mm; and a reference mirror surface (S3) 106 that is aspherical with a concave radius of curvature (RofC) of 128.843 mm with a conic constant of 0.0091 and a clear aperture radius of 24.0 mm. As mentioned elsewhere the radius of the aperture of input/output optical fiber 128 (S4) can be less than 0.005 mm such as the 0.0025 mm listed in FIG. 9. The exemplary prescription of the optical system presented in FIG. 9 will produce the exemplary light paths illustrated in FIGS. 4-7, 20A and 20B.

In this example, the combined surface figure errors of reference mirror surface 106 and primary mirror surface 110 should be significantly less than the wavelength of light to ensure good contrast of the resulting spectral interference fringes in spectrograph 320; the figure error of reference mirror surface 106 can be less than 0.5 microns RMS, or preferably less than 100 nanometers RMS over the clear aperture of reference mirror surface 106. Likewise, in this example the surface figure error of primary mirror surface 110 can be less than 0.5 microns RMS, or preferably less than 100 nanometers RMS over the clear aperture of primary mirror surface 110.

The reflective coating of reference mirror surface 106, primary mirror surface 110, and secondary mirror surface 116 can comprise a metal such as aluminum, chromium, silver, gold, or even silicon, and can have a thin transparent protective coating, such as silicon dioxide, installed atop the reflective coating. In this example, the reflective coating of reference mirror surface 106 can preferably have substantially the same spectral reflectance properties as the reflective coating of primary mirror surface 110, or the reflective coating of reference mirror surface 106 can be less reflective than the reflective coating of primary mirror surface 110 such that after accounting for the reflectivity of the test surface 140 the intensity of the measurement light entering the input/output optical fiber 128 is approximately the same intensity (i.e., within 20% of one another) as the reference light entering the input/output optical fiber 128.

In this first example, the CTE of the material of housing 102 should be less than 10 parts per billion (PPB) per degree C., or preferably less than 5 PPB, or more preferably the CTE of the material of housing 102 is less than 2 PPB. As an example, if the reference arm temperature changes by 0.1 degrees C., the optical path length of the reference arm is 200 mm, and the CTE of the material of housing 102 is 10 parts per billion (PPB) per degree C., then the optical path length of the reference arm will change by $2\times10^{-10}$ meters or 200 picometers—an amount much greater than the potential measurement accuracy of the present invention.

The method by which reference mirror 104, primary mirror 108, and even secondary spider support structure 120, secondary mirror 114, and fiber spider support structure 118 are bonded or attached to housing 102 should also not cause temperature-induced stresses and strains which can cause nanometer-scale movements, or even sub-nanometer scale movements, of the components with respect to one another. For example, if the optical components are all fabricated from ULE, then an organic UV glue or metallic or polymeric fasteners should not be employed to fasten the components together. In this example, a more preferable way to join the optical components of interferometer 100 together is to fabricate housing 102, reference mirror 104, primary mirror 108, secondary spider support structure 120, secondary mirror 114, fiber spider support structure 118 from ULE (or Zerodur) and then use a mixture of water, sodium hydroxide, and sodium silicate to bond the components together. With this process, known at times as hydroxide catalysis bonding (HCB), it is known that when the water evaporates, the sodium hydroxide and sodium silicate cause the glasseous optical components to chemically combine with one another such that they in effect become a unitary glass object. The resulting unitary glass object has substantially the same optical, thermal, and mechanical properties as the original glass of which the bonded components are composed.

Figure 4:
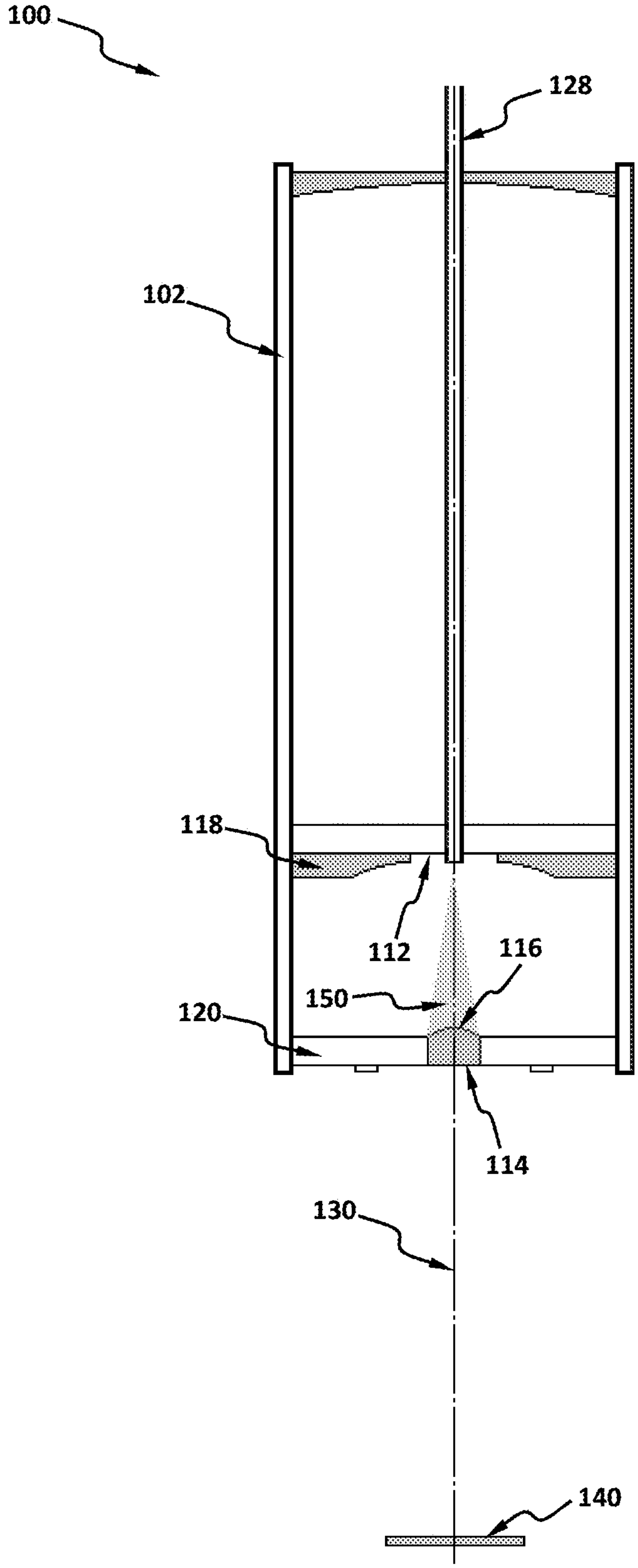
FIG. 4 is a side-view diagram illustrating the optical elements of a first example of an interferometer and the light cone associated with the input/output optical fiber in accordance with embodiments of the present invention.

With reference to FIG. 4, in operation source light is emitted from input/output optical fiber 128 into fiber light cone 150 whose angular width is largely determined by the numerical aperture of input/output optical fiber 128 as well as the amount of diffraction caused by the small single-mode core diameter of input/output optical fiber 128. The full (included) angle of fiber light cone 150 can be between 0.5 degrees and 45 degrees and can be configured so the diameter of fiber light cone 150 is the same as or greater than the diameter or clear aperture of secondary mirror surface 116 that the source light is incident upon.

Figure 5:
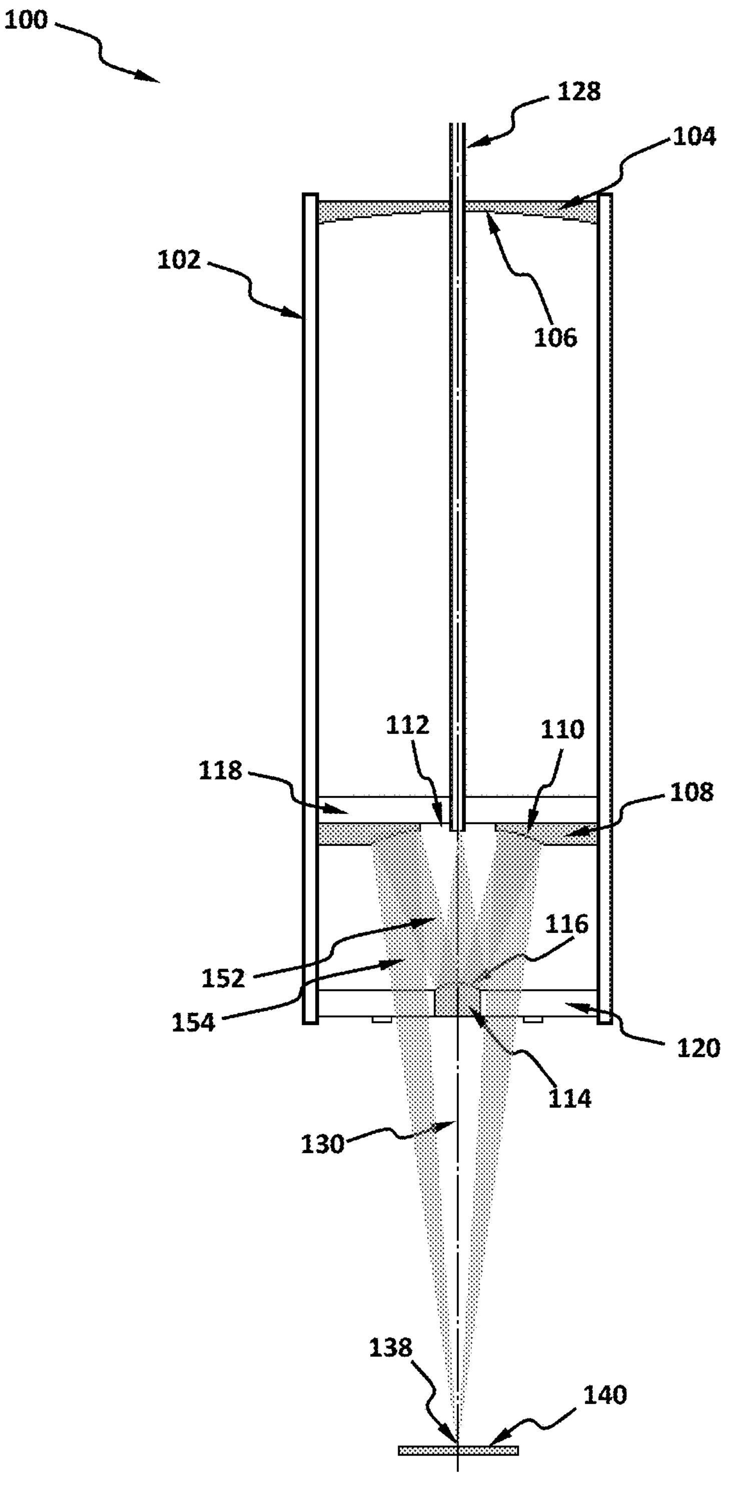
FIG. 5 is a side-view diagram illustrating the optical elements of a first example of an interferometer and the light paths associated with the measurement arm of the interferometer in accordance with embodiments of the present invention.

Source light within fiber light cone 150 that is incident upon secondary mirror surface 116 then reflects from secondary mirror surface 116 in accordance with the Law of Reflection into an outer portion primary light bundle 152 (as seen in FIG. 5) and an inner portion reference light bundle within reference light bundle 180 (as seen in FIG. 7). Continuing with reference to FIG. 7, reference light 182 within reference light bundle 180 becomes incident on reference mirror surface 106 and reflects from reference mirror surface 106 in accordance with the Law of Reflection into reflected reference light 184 within reference light bundle 180. Note that reflected reference light 184, like reference light 182, can have symmetry about optical axis 130, and occupy similar, if not substantially identical, overlapping spatial envelopes between secondary mirror surface 116 and reference mirror surface 106. Continuing with reference to FIG. 7, reflected reference light 184 within reference light bundle 180 becomes incident on secondary mirror surface 116 and reflects from secondary mirror surface 116 in accordance with the Law of Reflection into light within fiber light cone 150, and can be subsequently incident upon the aperture or core of input/output optical fiber 128 whereupon a portion of the reference light enters input/output optical fiber 128.

As mentioned above, source light within fiber light cone 150 that is incident upon secondary mirror surface 116 then reflects from secondary mirror surface 116 in accordance with the Law of Reflection into an outer portion primary light bundle 152 and an inner portion reference light bundle within reference light bundle 180. Continuing with reference to FIG. 6, measurement light 164 within primary light bundle 152 become incident on primary mirror surface 110 and reflects from primary mirror surface 110 in accordance with the Law of Reflection into test light 168 within measurement light bundle 154. Test light 168 within measurement light bundle 154 is converging and comes to a focus at measurement spot 138 on test surface 140. A width of measurement spot 138 can be between 1.0 μm and 1.0 mm.

A portion of the light of measurement spot 138 is reflected, in accordance with the Law of Reflection, from test surface 140 into reflected test light 170. If test surface 140 is substantially perpendicular to optical axis 130 then reflected test light 170, like test light 168, can have symmetry about optical axis 130, and occupy similar, if not substantially identical, overlapping spatial envelopes between test surface 140 and primary mirror surface 110. If test surface 140 is not perpendicular to optical axis 130 then reflected measurement light will not have symmetry about optical axis 130. In either case, small portions of reflected test light 170 will be incident on photodetectors 122 on the underside of secondary spider support structure 120, and photodetectors 122 are configured as part of a sub-system used to determine the tilt of test surface 140 such that retrace errors associated with interferometer 100 can be removed as described below.

That portion of reflected test light 170 that is not incident on one of photodetectors 122 nor incident on secondary spider support structure 120 can be incident on primary mirror surface 110, and subsequently reflect from primary mirror surface 110 in accordance with the Law of Reflection into returned measurement light 166. If test surface 140 is substantially perpendicular to optical axis 130 then returned measurement light 166, like measurement light 164, can have symmetry about optical axis 130, and occupy similar, if not substantially identical, overlapping spatial envelopes between primary mirror surface 110 and secondary mirror surface 116. If test surface 140 is not perpendicular to optical axis 130 then returned measurement light 166 will not have symmetry about optical axis 130.

A portion of returned measurement light 166 can then be incident on secondary mirror surface 116 and reflect from secondary mirror surface 116 into entering fiber light 174 in accordance with the Law of Reflection. If test surface 140 is substantially perpendicular to optical axis 130 then entering fiber light 174, like exiting fiber light 172, can have symmetry about optical axis 130, and occupy similar, if not substantially identical, overlapping spatial envelopes between input/output optical fiber optic 128 and secondary mirror surface 116. If test surface 140 is not perpendicular to optical axis 130 then entering fiber light 174 will not have symmetry about optical axis 130.

For the present invention the value of the magnification, hereinafter referred to as "M", can be between 0.1 and 10.0, but for exemplary purposes will have a value of 2.0 (meaning the measurement arm is twice as long as the source arm and the diameter of measurement spot 138 is twice the diameter of the aperture of input/output optical fiber 128). In the following calculations the length of the measurement arm will be referred to as the Measurement Arm Length, or "MAL", and the length of the source arm will be referred to as the Source Arm Length, or "SAL". The value of SAL can be between 5 mm and 500 mm but will have an illustrative value of 50 mm. The value of MAL can be between 5 mm and 1000 mm but will have an illustrative value of 125 mm. In this example, therefore, the magnification M is 2.5.

The reflective surfaces comprising interferometer 100, namely secondary mirror surface 116, reference mirror surface 106, and primary mirror surface 110, can and will have subtle manufacturing flaws that result in surface topographies that differ somewhat, and generally uncontrollably, from the ideal or as-designed surface prescription. These surface figure errors can be less than 1.0 μm peak-to-valley, or preferably less than 0.10 μm peak-to-valley. These surface figure errors can cause spurious variations in OPL (optical path length) and OPD (optical path difference which is the difference in optical path length between the measurement and reference arms of interferometer 100) which can limit the accuracy of the displacement measurements of interferometer 100 to approximately the amount of the OPD variation. Further complicating matters is that, since the three reflective surfaces will generally not have perfect rotational symmetry due to the manufacturing errors, then the amount of OPD error will be a strong function of the tilt of test surface 140 with respect to optical axis 130.

Figure 20B:
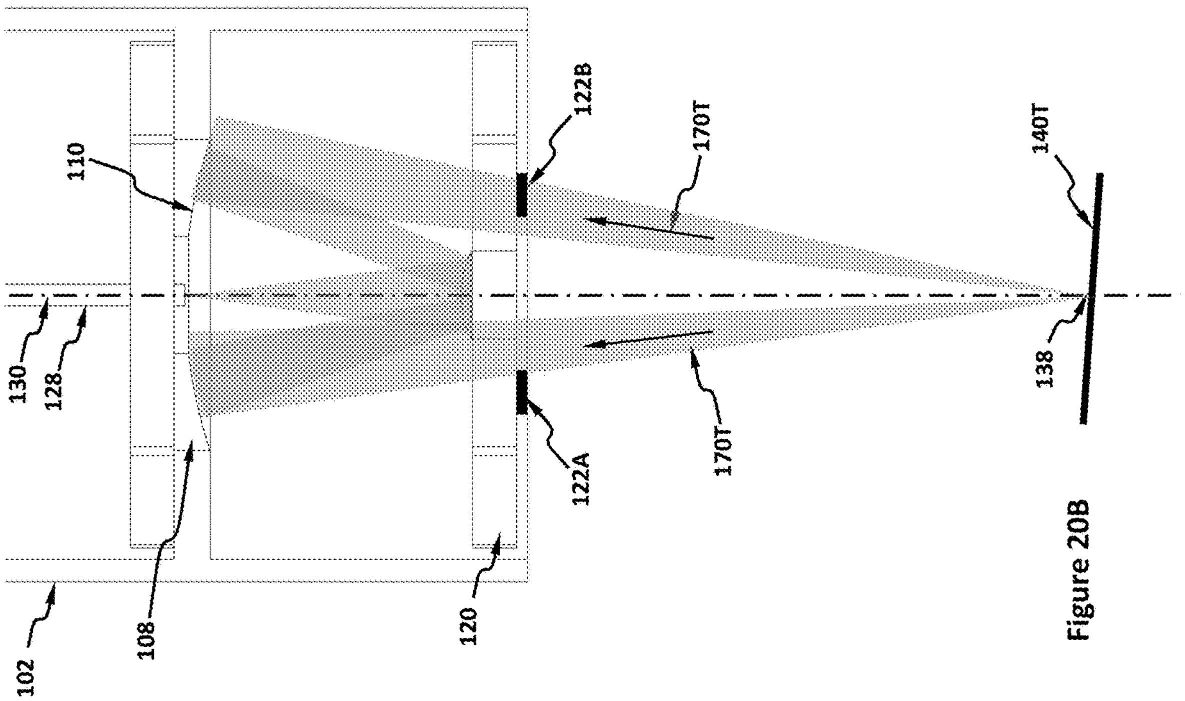
FIG. 20B is an illustration of the relationship of the reflected measurement light with the photodetectors when the test surface is tilted with respect to the optical axis of the interferometer.
Figure 20A:
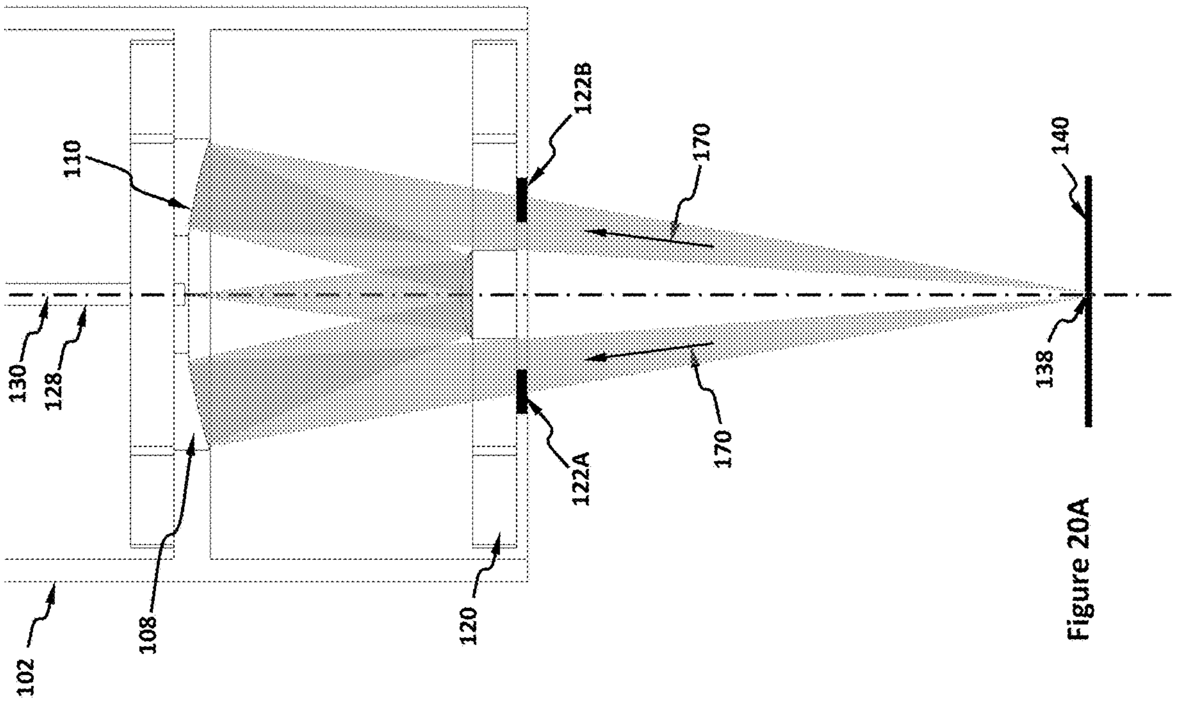
FIG. 20A is an illustration of the relationship of the reflected measurement light with the photodetectors with an untilted test surface.

Photodetectors 122 (e.g., photodetectors 122A through 122E) are provided and configured to detect shifts in the intensity of reflected test light 170 associated with tilts of test surface 140 as seen in FIG. 20A and FIG. 20B. Further, knowing a priori, an actual displacement of test surface 140 with respect to interferometer 100, while also knowing, a priori, the tilt of test surface 140 with respect to optical axis 130, allows for the calibration of the OPD of interferometer 100 as a function of displacement and tilt of test surface 140 for a nominally constant displacement of test surface 140. That is, during a calibration process in which the tilt and displacement of test surface 140 is known and controllably varied, the displacement measured by interferometer 100 (which contains the spurious OPD errors caused by the mirror surface errors) is noted as are the outputs of the photodetectors 122 which are associated with and indicative of the tilt of test surface 140 for a given displacement measurement. In this way a calibration table of displacement value as a function of test surface tilt, or alternately a mathematical calibration function that relates surface tilt to a displacement value, can be constructed by way of the outputs of the photodetectors 122.

Example 2

Figure 10:
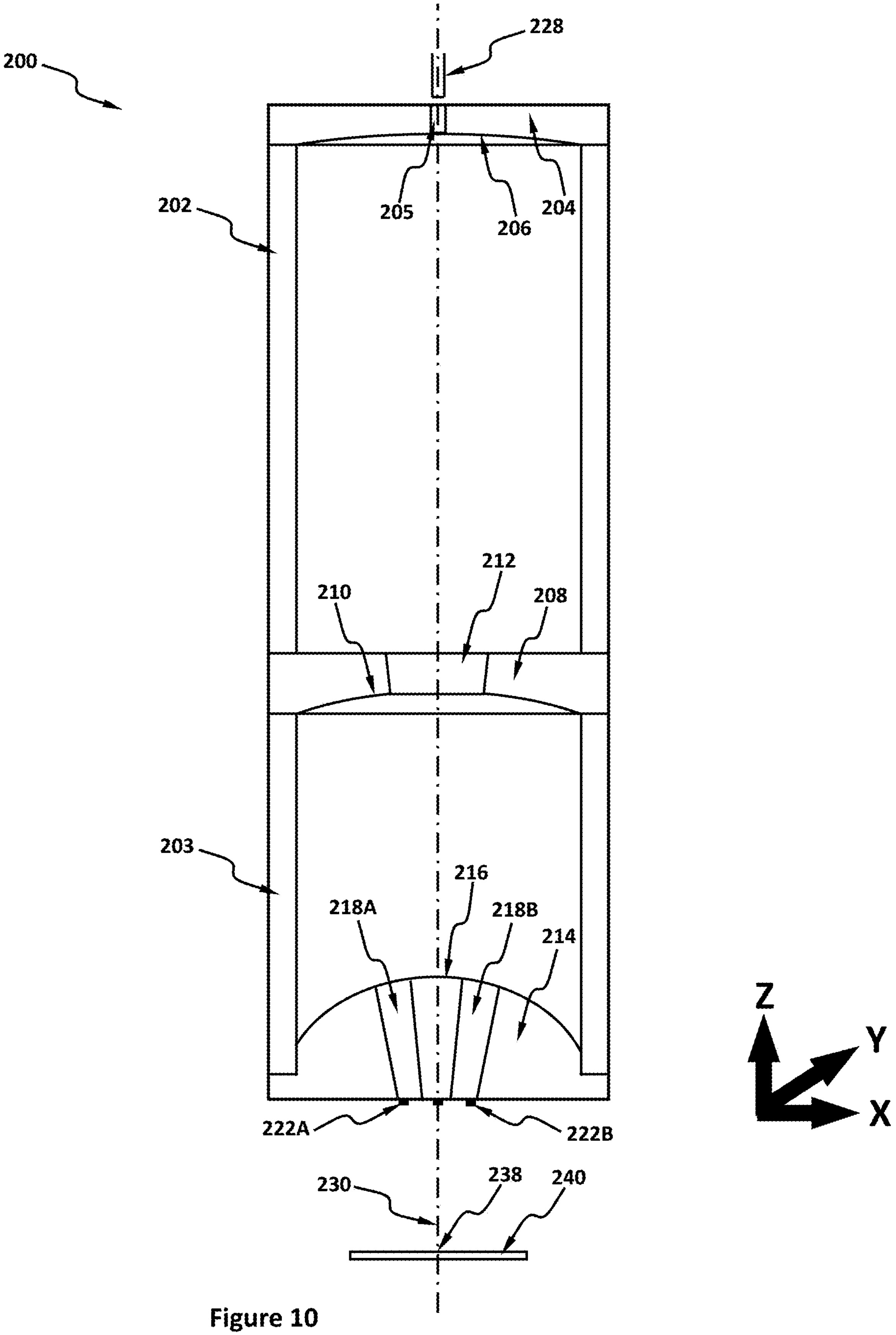
FIG. 10 is a side-view diagram illustrating the optical elements of a second example of an interferometer in accordance with embodiments of the present invention.
Figure 11:
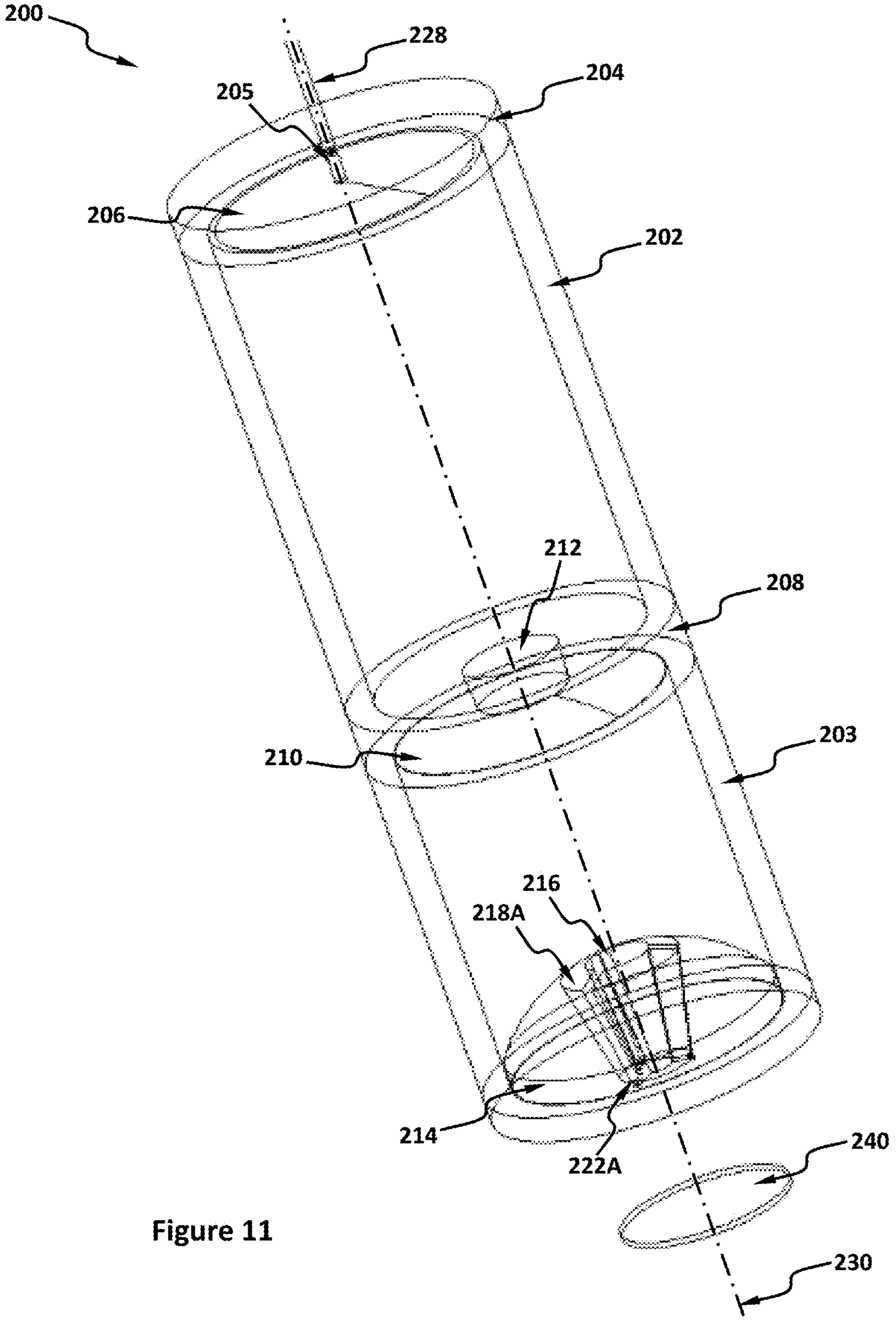
FIG. 11 is an oblique-view diagram illustrating the optical elements of a second example of an interferometer in accordance with embodiments of the present invention.

A second example of an interferometer 200 in accordance with examples of the claimed technology is illustrated in FIGS. 10 and 11. In this example, the interferometer 200 comprises an upper spacer 202, a lower spacer 203, a reference mirror 204 having a reference mirror surface 206, a primary mirror 208 having a primary mirror surface 210, secondary mirror 214 having a secondary mirror surface 216, secondary mirror apertures 218A through 218C and lower surface 220, an input/output optical fiber 228, a test surface 240, and a plurality of photodetectors 222A through 222C affixed to arms 224A through 224C of secondary mirror lower surface 220, although interferometer 200 may have other types and/or numbers of other components and/or other elements in other configurations. Interferometer 200 can also include an optical axis 230 that substantially passes through the center(s) of the reflective optical components of interferometer 200 and also substantially passes through the center of the envelope of light bundles propagating through interferometer 200 when the test surface 240 is orthogonal to the optical axis 230.

Figure 16:
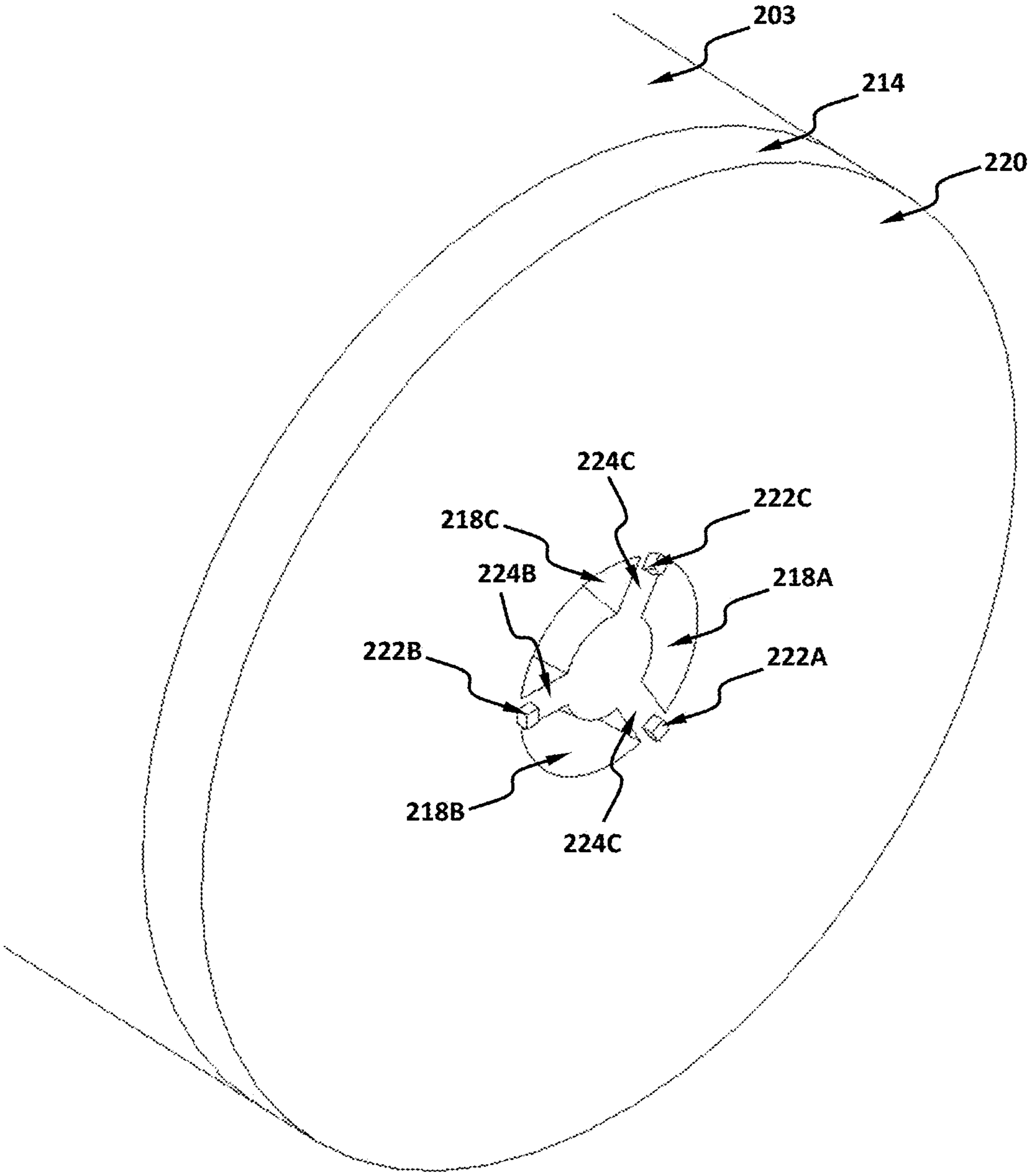
FIG. 16 is an enlarged oblique-view diagram illustrating the lower surface of the primary mirror, the primary mirror apertures, and the light detectors of a second example of an interferometer in accordance with embodiments of the present invention.

Continuing with reference to FIGS. 10, 11, and 16, upper spacer 202 and lower spacer 203 can be hollowed rigid components in or between which the optical elements of interferometer 200 are directly or indirectly mounted. In this example, upper spacer 202 and lower spacer 203 preferably have a cylindrical outer surface substantially centered on optical axis 230 and a cylindrical inner surface also substantially centered on optical axis 230. Accordingly, the cross-sectional shape of the outer and inner surfaces of upper spacer 202 and lower spacer 203 are substantially circular, although they can instead be elliptical, or polygonal. In this example, an inner width of upper spacer 202 and/or lower spacer 203 can be between 8 mm and 200 mm, an outer width of upper spacer 202 and/or lower spacer 203 can be between 10 mm and 250 mm, and the wall thickness (i.e., the difference between the half-widths of an outer surface and an inner surface) of upper spacer 202 and/or lower spacer 203 can be between 1 mm and 50 mm. In this example, the length (i.e., in the Z-direction) of upper spacer 202 and/or lower spacer 203 can be between 25 mm and 500 mm but is preferably less than 100 mm. In this example, upper spacer 202 and/or lower spacer 203 can be produced with additive or subtractive fabrication processes and are preferably composed of a material having a low CTE (coefficient of thermal expansion) such as Invar, Zerodur, or ULE. Further, in this example upper spacer 202 is most preferably composed of the same material that reference mirror 204 is composed of so their CTE's match; similarly lower spacer 203 is preferably composed of the same material that primary mirror 208 and secondary mirror 214 are also composed of, although other types and/or combinations of materials can be used. As seen in FIGS. 10 and 11, reference mirror 204 can be directly coupled to upper spacer 202, primary mirror 208 can be directly coupled to upper spacer 202, primary mirror 208 can be directly coupled to lower spacer 203, and secondary mirror 214 can be directly coupled to lower spacer 203. Upper spacer 202 and lower spacer 203 can be provided with mechanical features, such as notches, flats, or locating fiducials, to facilitate the coupling(s). Upper spacer 202 and/or lower spacer 203 can also have features machined into one or more of its surfaces to facilitate locating, placement, or mounting of the components, such as primary mirror 208, reference mirror 204, or secondary mirror 214, or for adjusting or aligning these components while interferometer 200 is being assembled. Upper spacer 202 and/or lower spacer 203 can also have features or provisions to facilitate the mounting or attachment of interferometer 200 into a metrology or positioning system such as a CMM (coordinate measurement machine).

Continuing with reference to FIGS. 10 and 11, reference mirror 204 is an optical element having a reflective reference mirror surface 206. An annular face of reference mirror 204 can be mechanically coupled or bonded to an end of upper spacer 202. In this example, the substrate of reference mirror 204 is preferably composed of a material having a low CTE such as Invar, Zerodur, or ULE. In this example, the edge thickness of reference mirror 204 can be between 1 mm and 20 mm, and reference mirror surface 206 can be a concave surface having a spherical, aspherical, parabolic, hyperbolic, or even an elliptical prescription, and preferably is centered on optical axis 230 and has rotational symmetry about optical axis 230. Reference mirror 204 has a central hole substantially centered on optical axis 230 through which input/output optical fiber 228 can pass or through which light exiting from or entering into optical fiber 128 can pass. The width of the central hole can be between 0.1 mm and 5.0 mm. In this example, the peak-to-valley (P-V) surface error of reference surface mirror 206 can be less than 1.0 micrometers within the clear aperture of reference mirror surface 206 but preferably has P-V surface error less than 0.5 micrometers or more preferably less than 0.1 micrometers. In this example, reference mirror surface 206 is preferably a mirror that is reflective to the wavelengths of light utilized by interferometer 200 and has a reflectivity to these wavelengths of greater than 80%, or preferably greater than 90%, or more preferably greater than 96%, although the reflectivity of reference mirror surface 206 can be substantially the same as the reflectivity of test surface 240. The reflective layer on reference mirror surface 206 can in this example comprise a metal, such as aluminum or silver, or composed of a stack of dielectric thin films, or reference mirror surface 206 can operate without benefit of a reflective layer. Note that reference mirror 204 in conjunction with secondary mirror 214 form the reference arm of interferometer 200. Reference mirror 204 can also have features machined into one or more of its surfaces to facilitate mounting, locating, adjusting, or aligning of the reference mirror 204 to upper spacer 202 and/or with respect to other optical or non-optical component of interferometer 200.

Figure 15:
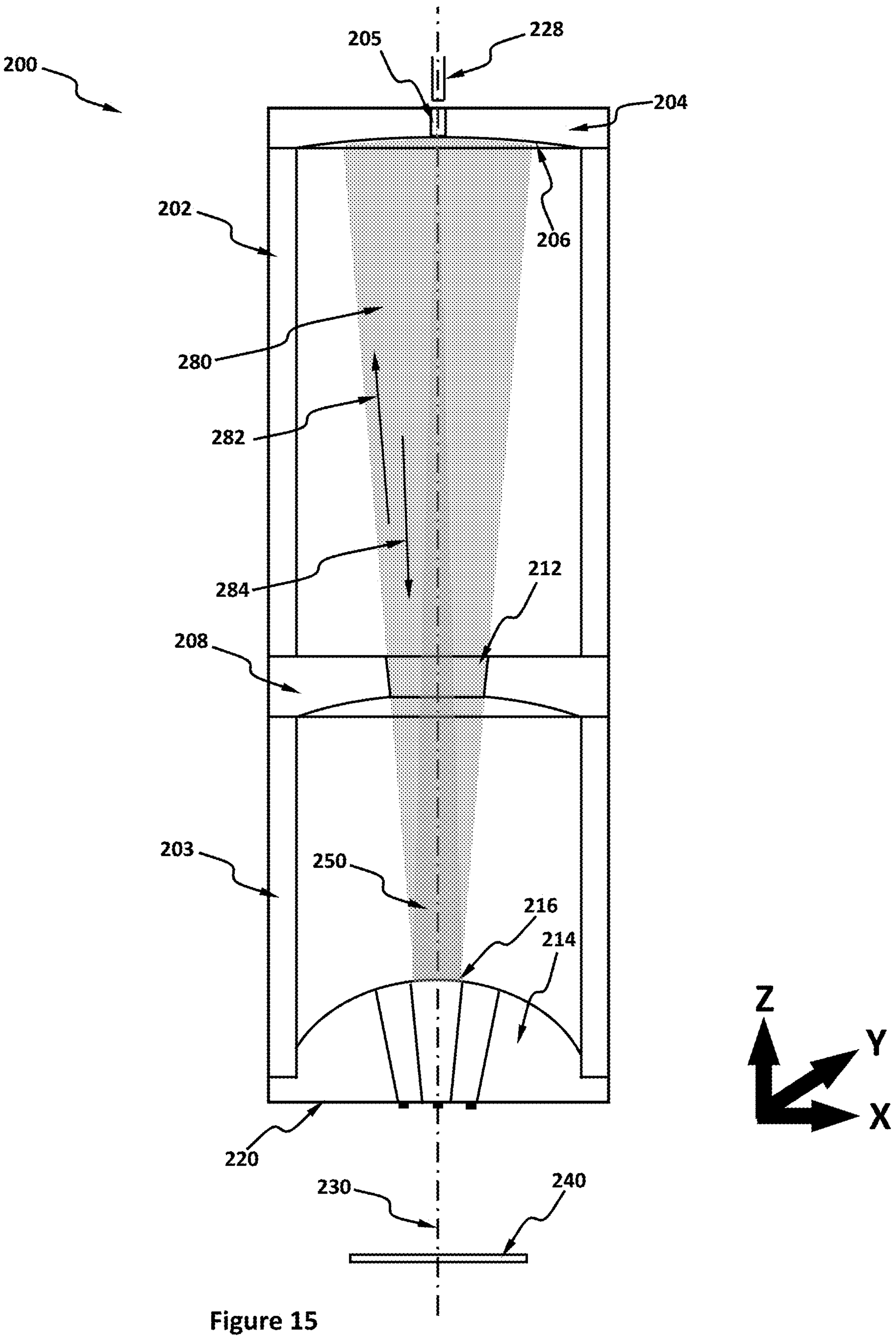
FIG. 15 is a side-view diagram illustrating the optical elements and light paths of a reference arm of a second example of an interferometer in accordance with embodiments of the present invention.

Continuing with reference to FIGS. 10 and 11, primary mirror 208 is an optical element having a reflective primary mirror surface 210. In this example, primary mirror 208 can be mechanically coupled to upper spacer 202 and lower spacer 203 such that primary mirror 208 is held rigidly in position with respect to reference mirror 204 and secondary mirror 214. The outer diameter of primary mirror 208 can be between 6 mm and 100 mm. In this example, the substrate of primary mirror 208 is preferably composed of a material having a low CTE such as Invar, Zerodur, or ULE. In this example, the edge thickness of primary mirror 208 can be between 1 mm and 20 mm, and primary mirror surface 210 can be a concave surface having a spherical, aspherical, parabolic, hyperbolic, or even an elliptical prescription, and preferably is centered on optical axis 230 and has rotational symmetry about optical axis 230. Primary mirror 208 has a central hole or aperture 212 substantially centered on optical axis 230 through which light exiting from or entering into optical fiber 128 can pass or through which reference light can pass, both of which are described in detail below. Aperture 212 must be of sufficient width to allow reference light 282 and reflected reference light 284 to pass as shown in FIG. 15. The width of aperture 212 can be between 1.0 mm and 50.0 mm. In this example, the peak-to-valley surface error of primary mirror surface 210 can be less than 1.0 micrometers within the clear aperture of primary mirror surface 210 but preferably has P-V surface error less than 0.5 micrometers or more preferably less than 0.1 micrometers. In this example, the primary mirror surface 210 is preferably a mirror that is reflective to the wavelengths of light utilized by interferometer 200 and has a reflectivity to these wavelengths of greater than 80%, or preferably greater than 90%, or more preferably greater than 96%. The reflective layer on primary mirror surface 210 can in this example comprise a metal, such as aluminum or silver, or be composed of a stack of dielectric thin films. Note that primary mirror 208 in conjunction with secondary mirror 214 form the measurement arm of interferometer 200. Primary mirror 208 can also have features machined into one or more of its surfaces to facilitate locating, adjusting, aligning, or mounting of the primary mirror 208 to upper spacer 102 and/or lower spacer 203.

Continuing with reference to FIGS. 10 and 11, secondary mirror 214 is an optical element having a reflective secondary mirror surface 216. Secondary mirror 214 can be mechanically coupled to lower spacer 203 such that secondary mirror 214 is held rigidly in position with respect to lower spacer 203, reference mirror 204 and primary mirror 208. The outer diameter of secondary mirror 214 can be between 2 mm and 50 mm. In this example, the substrate of secondary mirror 214 is preferably composed of a material having a low CTE such as Invar, Zerodur, or ULE. The center thickness of secondary mirror 214 can be between 1 mm and 25 mm, and secondary mirror surface 216 can be a convex surface having a preferably spherical prescription, although aspherical, parabolic, hyperbolic, or even an elliptical prescription is possible as well. In this example, the secondary mirror surface 216 is also preferably centered on optical axis 230 and has rotational symmetry about optical axis 230 within the clear aperture of the secondary mirror surface 216; the clear aperture of secondary mirror surface 216 can b between 1.0 and 20.0 mm. In this example, the peak-to-valley surface error of secondary mirror surface 216 can be less than 1.0 micrometers within the clear aperture of secondary mirror surface 216 but preferably has P-V surface error less than 0.5 micrometers or more preferably less than 0.1 micrometers. In this example, the secondary mirror surface 216 is preferably a mirror that is reflective to the wavelengths of light utilized by interferometer 200 and has a reflectivity to these wavelengths of greater than 80%, or preferably greater than 90%, or more preferably greater than 96%. The reflective layer on secondary mirror surface 216 can in this example comprise a metal, such as aluminum or silver, or be composed of a stack of dielectric thin films.

Continuing with reference to FIGS. 10, 11, and 16, secondary mirror 214 is also provided with a plurality of apertures such as secondary mirror aperture 218A through 218C that are substantially centered on optical axis 230 and extend from secondary mirror lower surface 220 up to secondary mirror surface 216, although other types, configurations, and numbers of secondary mirror apertures are possible as well. Note that the aperture of secondary mirror surface 216 can approach the inner edge of the secondary mirror apertures 218A through 218C. Secondary mirror apertures 218A through 218C allow for light from the measurement arm of interferometer 200 to exit the body of interferometer 200 and reach the test surface 240, and also allow light reflected from test surface 240 to re-enter the body of interferometer 200. At the secondary mirror lower surface 220, the arms 224A through 224C between secondary mirror apertures 218A through 218C provide a surface onto which photodetectors 220A through 220C can be installed. The width of the arms 224A through 224C at the secondary mirror lower surface 220 can be between 0.5 and 4.0 mm, while the length of the arms 224A through 224C at the secondary mirror lower surface 220 can be between 1.0 and 20 mm; the widths of the arms 224A through 224C are preferably as small as possible to minimize the amount of measurement light 254 that is blocked by the arms.

Continuing with reference to FIGS. 10 and 11, and with particular reference to FIG. 16, an array of small photodetectors, such as photodetectors 222A through 222E, can be installed on the arms 224A through 224C of secondary mirror lower surface 220 that faces test surface 140. Photodetectors, such as photodetectors 222A through 222C, can be used to detect a portion of the reflected test light 270 that is reflected from test surface 240 such that the tilt of test surface 240 with respect to optical axis 230 can be determined, as described below in connection to FIG. 18, and FIGS. 20A and 20B, so that the retrace errors—which are a strong function of test surface tilt—can be calibrated and removed from the measurements made by interferometer 200 and interferometer system 300. The number of photodetectors 222 can vary in accordance with the number of arms 224 of secondary mirror 214 such that there is one photodetector, such as photodetector 222A, for each arm such as arm 224A of secondary mirror 214, which can be between two and ten. Each photodetector 222 can be radially positioned on its respective arm 224 of secondary mirror 214 between 1 mm and 50 mm from the optical axis 230, wherein the radial positioning is substantially the same for each photodetector 222. The width of photodetectors 222 can be the same as the width of the arms 224 of secondary mirror 214, or thinner, such as less than 1.0 mm, to minimize the amount of reflected test light 270 that is blocked by photodetectors 222. The length of photodetectors 222 can be the same as the radial length of the arms 224 of secondary mirror 214, or less than the lengths of the arms of secondary mirror 214. The length of photodetectors 222 can be between 0.5 mm and 50.0 mm, and further, there can be more than one photodetector mounted on an arm of secondary mirror 214. Photodetectors 222 can be photodiodes, PIN photodiodes, or even avalanche photodiodes, and can operate in either photovoltaic or photoconductive modes, and can comprise a semiconductor material such as Silicon, Germanium, GaAs, or InGaAs.

Input/output optical fiber 228 is an optical fiber through which is delivered into interferometer 200 broadband light from a broadband light source, and through which light exits from interferometer 200 and is delivered to an optical analyzer such as a spectrometer. In this example, the input/output optical fiber 228 can be a multi-mode fiber but is preferentially a single-mode fiber having a core 6 μm's or less in diameter. In this example, the outer diameter of the jacket of input/output optical fiber 228 can be less than or equal to 3.0 mm. In this example, the input/output optical fiber 228 is transmissive to those wavelengths of light that interferometer 200 uses such as from 500 nm to 600 nm, or more preferably from 450 nm to 700 nm, or even more preferably from 400 nm to 800 nm. A good candidate fiber for use as input/output optical fiber 228 is the SM450 fiber from Thorlabs (Newton, NJ, USA) which has an outer jacket or cladding diameter of 0.245 mm and is highly transmissive from 488 nm to 633 nm but nonetheless has adequate light transmissivity from 430 nm to 800 nm wavelengths for use with interferometer 100.

Test surface 240 is that surface that is provided by the user whose topography is to be measured by interferometer system 300 wherein the topographical data can comprise a series or an array of individual displacement measurements. The displacement can be defined as that distance along optical axis 230 from measurement spot 238 on test surface 240 to a suitable, yet somewhat arbitrary, point on optical axis 230 such as, for example, where optical axis 230 intersect the apex of secondary mirror surface 216 or, for example, where optical axis 230 intersects the aperture of input/output optical fiber 228. Since what is generally desired as an output from interferometer system 300 is the change in displacement as interferometer 200 is scanned over test surface 240, the actual displacement end-point within interferometer 200 is arbitrary, although it must not change during the scanning and measurement processes. Alternately, interferometer 200 with interferometer system 300 can compute optical path differences (OPD) between the reference arm of interferometer 200 and measurement arm of interferometer 200 in which case the OPD indicates changes in displacement (the change in OPD being substantially equal to two times the change in displacement) as the interferometer is scanned in which case no end-point within interferometer 200 is utilized.

In operation, interferometer 200 is scanned or translated across test surface 240 in a linear, curved, piecewise-linear, or areal pattern such that interferometer 200 can measure the displacement to (or elevation of) test surface 240 in more than one location so the relative displacement between the two or more locations can be determined. Test surface 240 is generally a surface of an article of manufacture such as an optical surface such as, for example, the surface of a mirror, a window, or a lens. Test surface 240 can be substantially planar, or curved such as spherical, aspherical, free-form, cylindrical, acylindrical, parabolic, or even elliptical in shape. Test surface 240 can have a width as small as 0.5 mm or a width of up to 5000 mm or more. Test surface 140 can have a sag, or a range of displacement, of from less than 2 nanometers up to 1000 millimeters. The perimeter shape of test surface 240 can be substantially circular, elliptical, square, rectangular, hexagonal, or polygonal. Test surface 240 can be reflective having a reflectivity (to a certain band of wavelengths) greater than 90%, or absorptive such that 90% or more of the light incident upon it (within a certain band of wavelengths) is absorbed, or transmissive in which more than 50% of the light incident upon it (within a certain band of wavelengths) passes through test surface 240. In this example, test surface 240 can be specular and accordingly be highly polished, or test surface 240 can have a slight texture and if textured the standard deviation of the width of the features of the texture is preferably less than half the width of measurement spot 238 on test surface 240. Finally test surface 240 can be substantially perpendicular to optical axis 230 at measurement spot 238 or test surface 240 can be tilted with respect to optical axis 230, the amount of tilt being less than 5°, or up to 10°, or even 20° or more, although greater amounts of tilt have corresponding less amounts of light throughput through the measurement arm of interferometer 200.

Interferometer 200, like most interferometers, can be described as having four arms: a source arm, a reference arm, a measurement arm, and an output arm, some of which overlap or even share the same components in interferometer 200. The source arm of interferometer 200 is that arm that sources light into interferometer 200 and includes input/output optical fiber 228 and secondary mirror surface 216. The reference arm of interferometer 200 is that arm that provides reference light to interfere with light from the measurement arm and includes secondary mirror surface 216 and reference mirror surface 206 of reference mirror 204. The measurement arm of interferometer 200 is that arm that provides measurement light to interfere with light from the reference arm and includes secondary mirror surface 216, primary mirror surface 210 of primary mirror 208, and test surface 240. The output arm of interferometer 200 is that arm that outputs light from interferometer 200 and includes input/output optical fiber 228 and secondary mirror surface 216 of secondary mirror 214.

The prescription of this second exemplary configuration of the optics of interferometer 200 is presented in FIG. 17. As seen in FIG. 17, there are five optical surfaces in the system including a secondary mirror surface (S1) 216 located at an elevation defined to be Z=0.000 mm, a test surface (S0) 240 with a nominal location 48.181 mm below S1, a primary mirror surface 210 (S2) 36.159 mm above S1, a reference mirror surface 206 (S3) 120.000 mm above S1, and an input/output aperture associated with input/output optical fiber 228 (S4) located 150.000 mm above S1. Also as seen in FIG. 17, the prescription includes a secondary mirror surface (S1) 216 that is spherical with a convex radius of curvature (RofC) of 30.009 mm and a clear aperture radius of 5.05 mm; a primary mirror surface (S2) 210 that is aspherical with a concave radius of curvature (RofC) of 62.623 mm with a conic constant of 0.00759 and a clear aperture radius of 22.50 mm; and a reference mirror surface (S3) 206 that is aspherical with a concave radius of curvature (RofC) of 133.642 mm with a conic constant of 0.02848 and a clear aperture radius of 23.0 mm. As mentioned elsewhere the radius of the aperture of input/output optical fiber 228 (S4) can be less than 0.005 mm such as the 0.0025 mm listed in FIG. 17. The exemplary prescription of the optical system presented in FIG. 17 will produce the exemplary light paths illustrated in FIGS. 12-15.

In this example, the combined surface figure errors of reference mirror surface 206 and primary mirror surface 210 should be significantly less than the wavelength of light to ensure good contrast of the resulting spectral interference fringes in spectrograph 320; the figure error of reference mirror surface 206 can be less than 0.5 microns RMS, or preferably less than 100 nanometers RMS over the clear aperture of reference mirror surface 206. Likewise, in this example the surface figure error of primary mirror surface 210 can be less than 0.5 microns RMS, or preferably less than 100 nanometers RMS over the clear aperture of primary mirror surface 210.

The reflective coating of reference mirror surface 206, primary mirror surface 210, and secondary mirror surface 216 can comprise a metal such as aluminum, chromium, silver, gold, or even silicon, and can have a thin transparent protective coating, such as silicon dioxide, installed atop the reflective coating. In this example, the reflective coating of reference mirror surface 206 can preferably have substantially the same spectral reflectance properties as the reflective coating of primary mirror surface 210, or the reflective coating of reference mirror surface 206 can be less reflective than the reflective coating of primary mirror surface 210 such that after accounting for the reflectivity of the test surface 240 the intensity of the measurement light entering the input/output optical fiber 228 is approximately the same intensity (i.e., within 20% of one another) as the reference light entering the input/output optical fiber 228.

In this second example, the CTE of the material of upper spacer 202 and/or lower spacer 203 can be less than 10 parts per billion (PPB) per degree C., or preferably less than 5 PPB, or more preferably the CTE of the upper spacer 202 and/or lower spacer 203 is less than 2 PPB. These low-CTE requirements can be illustrated by an example: if the reference arm temperature changes by 0.1 degrees C., the length of the upper spacer 202 is 100 mm, and the CTE of the material of upper spacer 202 is 10 parts per billion (PPB) per degree C., then the optical path length of the reference arm will change by $2\times0.1\times0.1\times10\times10^{-9}$ meters or 200 picometers—an amount greater than the potential measurement accuracy of the present invention.

The method by which reference mirror 204, primary mirror 208, and secondary mirror 114 are bonded or attached to upper spacer 202 and/or lower spacer 203 should also not cause temperature-induced stresses and strains which can cause nanometer-scale movements, or even sub-nanometer scale movements, of the components with respect to one another. For example, if the optical components are all fabricated from ULE, then an organic UV glue or metallic or polymeric fasteners should not be employed to fasten the components together. In this example, a more preferable way to join the glasseous opto-mechanical components (i.e., upper spacer 202, lower spacer 203, reference mirror 204, primary mirror 208, and secondary mirror 214) of interferometer 200 together is to apply a bonding agent composed of a mixture of water, sodium hydroxide, and sodium silicate to the mating surfaces of the components. With this process, known at times as hydroxide catalysis bonding (HCB), it is known that as the water evaporates, the sodium hydroxide and sodium silicate cause the glasseous optical components to chemically combine with one another such that they in effect become a unitary glass object. The resulting unitary glass object has substantially the same optical, thermal, and mechanical properties as the original glass of which the bonded components are composed.

Figure 12:
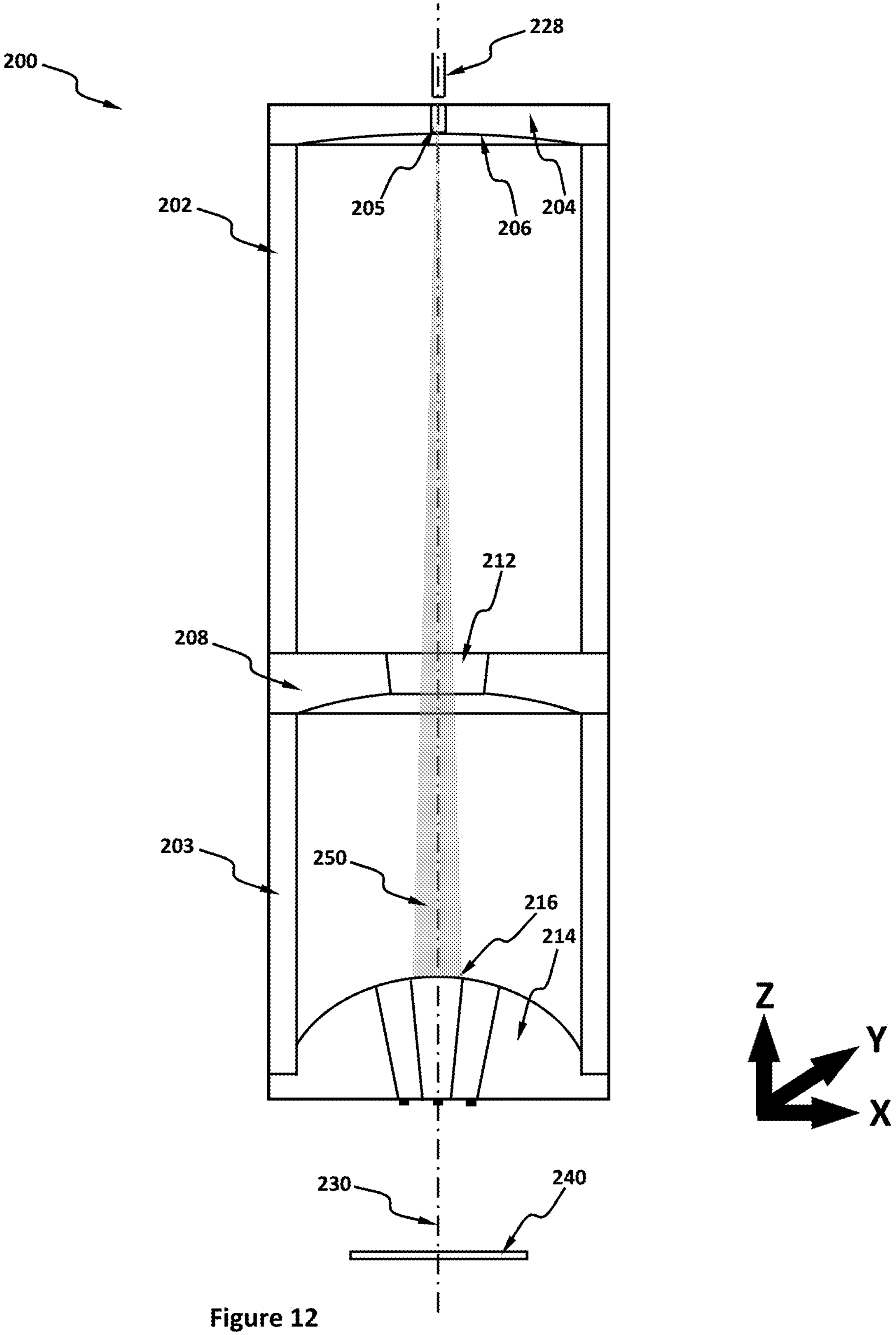
FIG. 12 is a side-view diagram illustrating the optical elements of a second example of an interferometer and the light cone associated with the input/output optical fiber in accordance with embodiments of the present invention.

With reference to FIG. 12, in operation source light is emitted from input/output optical fiber 228 into fiber light cone 250 whose angular width is largely determined by the numerical aperture of input/output optical fiber 228 as well as the amount of diffraction caused by the small single-mode core diameter of input/output optical fiber 228. The full (included) angle of fiber light cone 250 can be between 0.5 degrees and 25 degrees and can be configured so the diameter of fiber light cone 250 is the same as or greater than the diameter or clear aperture of secondary mirror surface 216 that the source light is incident upon.

Figure 13:
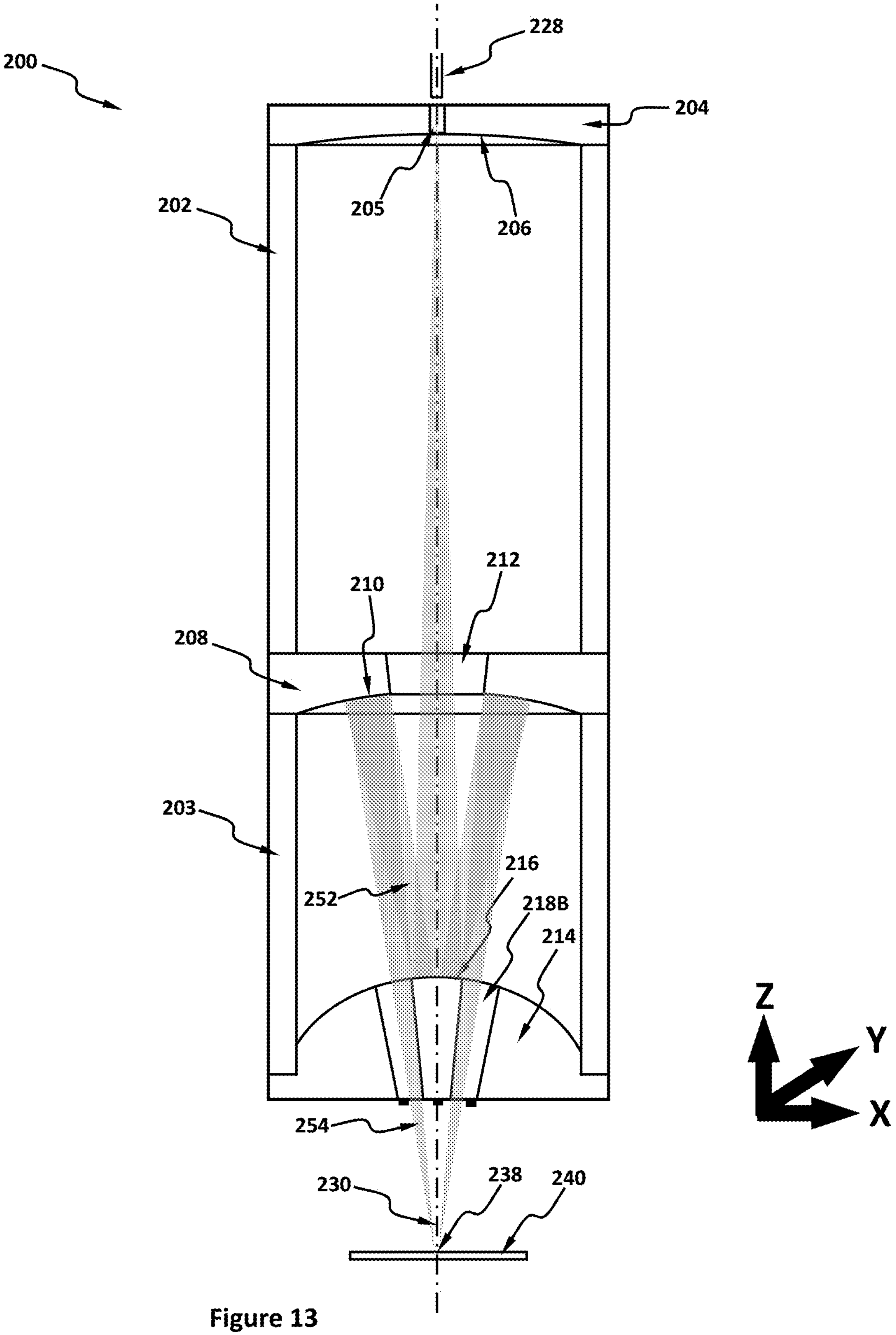
FIG. 13 is a side-view diagram illustrating the optical elements of a second example of an interferometer and the light paths associated with the measurement arm of the interferometer in accordance with embodiments of the present invention.

Source light within fiber light cone 150 that is incident upon secondary mirror surface 216 then reflects from secondary mirror surface 216 in accordance with the Law of Reflection into an outer portion of primary light bundle 252 (as seen in FIG. 13) and an inner portion of reference light bundle 254 within reference light bundle 280 (as seen in FIG. 15). Continuing with reference to FIG. 15, reference light 282 within reference light bundle 280 becomes incident on reference mirror surface 206 and reflects from reference mirror surface 206 in accordance with the Law of Reflection into reflected reference light 284 within reference light bundle 280. Note that reflected reference light 284, like reference light 282, can have symmetry about optical axis 230, and occupy similar, if not substantially identical, overlapping spatial envelopes between secondary mirror surface 216 and reference mirror surface 206. Continuing with reference to FIG. 15, reflected reference light 284 within reference light bundle 280 becomes incident on secondary mirror surface 216 and reflects from secondary mirror surface 216 in accordance with the Law of Reflection into light within fiber light cone 250, and can be subsequently incident upon the aperture or core of input/output optical fiber 228 whereupon a portion of the reference light enters input/output optical fiber 228.

Figure 14:
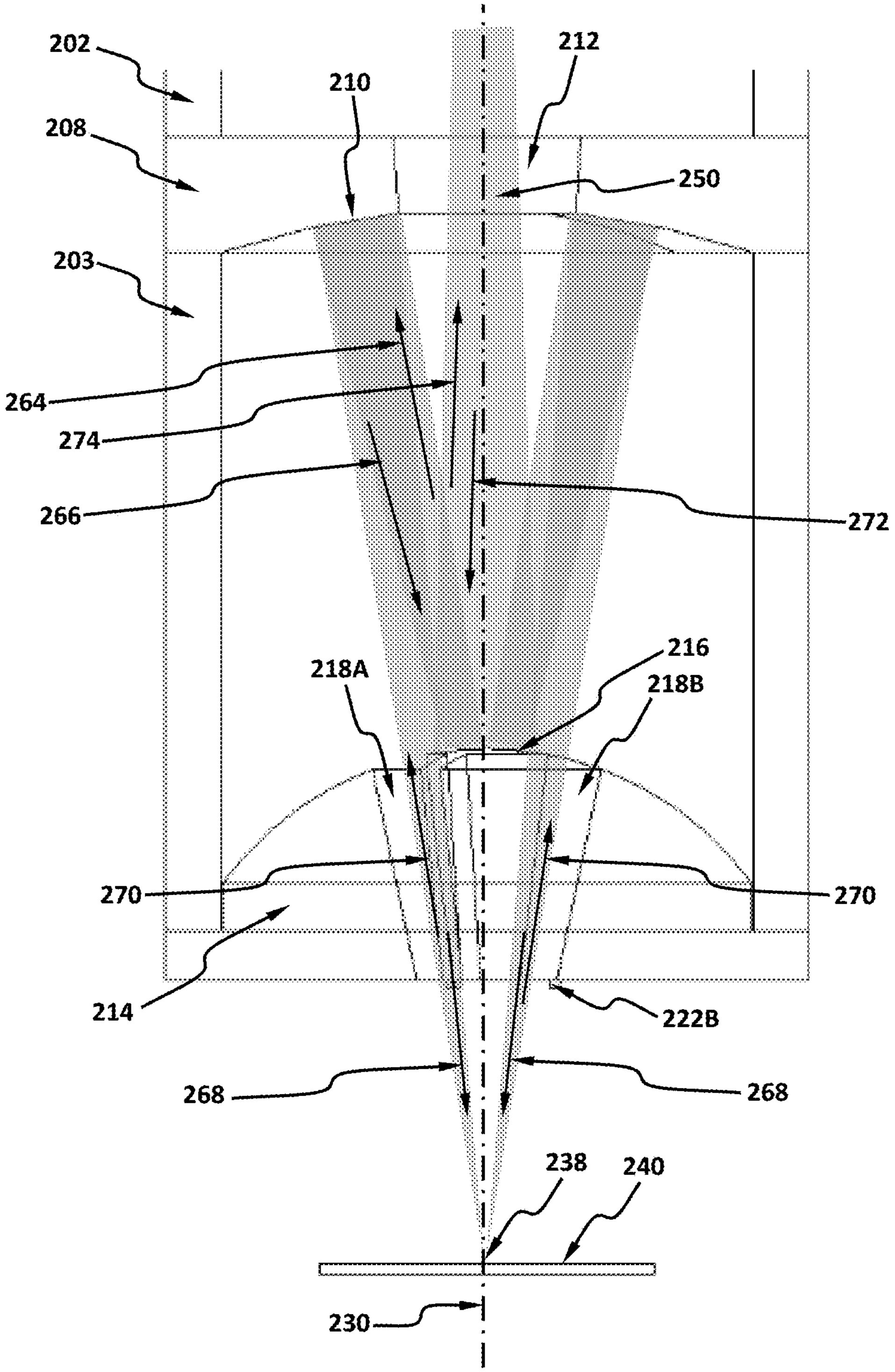
FIG. 14 is an enlarged side-view diagram illustrating the optical elements and light paths of a measurement arm of a second example of an interferometer in accordance with embodiments of the present invention.

As mentioned above, source light within fiber light cone 250 that is incident upon secondary mirror surface 216 then reflects from secondary mirror surface 216 in accordance with the Law of Reflection into an outer portion of primary light bundle 252 and an inner portion reference light bundle within reference light bundle 180 as seen in FIG. 13 and FIG. 14. Measurement light 264 within primary light bundle 252 become incident on primary mirror surface 210 and reflects from primary mirror surface 210 in accordance with the Law of Reflection into test light 268 within measurement light bundle 254. Test light 268 within measurement light bundle 254 is converging and comes to a focus at measurement spot 238 on test surface 240. A width of measurement spot 238 can be between 1.0 μm and 1.0 mm.

A portion of the light of measurement spot 238 is reflected, in accordance with the Law of Reflection, from test surface 240 into reflected test light 270. If test surface 240 is substantially perpendicular to optical axis 230 then reflected test light 270, like test light 268, can have symmetry about optical axis 230, and occupy similar, if not substantially identical, overlapping spatial envelopes (ignoring any shadowing effects caused by arms 224) between test surface 240 and lower secondary surface 220. If test surface 240 is not perpendicular to optical axis 230 then reflected measurement light will not have symmetry about optical axis 230. In either case, small portions of reflected test light 270 will be incident on photodetectors 222 on lower secondary surface 220, and photodetectors 222 are configured as part of a sub-system used to determine the tilt of test surface 240 such that retrace errors associated with interferometer 200 can be removed as described in connection with FIGS. 20A and 20B.

That portion of reflected test light 270 that is not incident on one of photodetectors 222 nor incident on arms 224 can be incident on primary mirror surface 210, and subsequently reflect from primary mirror surface 210 in accordance with the Law of Reflection into returned measurement light 266. If test surface 240 is substantially perpendicular to optical axis 230 then returned measurement light 266, like measurement light 264, can have symmetry about optical axis 230 (ignoring any shadowing effects caused by arms 224), and occupy similar, if not substantially identical, overlapping spatial envelopes between primary mirror surface 210 and secondary mirror surface 216. If test surface 240 is not perpendicular to optical axis 230 then returned measurement light 266 will not have symmetry about optical axis 230.

A portion of returned measurement light 266 can then be incident on secondary mirror surface 216 and reflect from secondary mirror surface 216 into entering fiber light 274 in accordance with the Law of Reflection. If test surface 240 is substantially perpendicular to optical axis 230 then entering fiber light 274, like exiting fiber light 272, can have symmetry about optical axis 230, and occupy similar, if not substantially identical, overlapping spatial envelopes between input/output optical fiber optic 228 and secondary mirror surface 216. If test surface 240 is not perpendicular to optical axis 230 then entering fiber light 274 will not have symmetry about optical axis 230.

For the present invention the value of the magnification, hereinafter referred to as "M", can be between 0.1 and 10.0, but for exemplary purposes will have a value of 2.0 (meaning the measurement arm is twice as long as the source arm and the diameter of measurement spot 238 is twice the diameter of the aperture of input/output optical fiber 228). In the following calculations the length of the measurement arm will be referred to as the Measurement Arm Length, or "MAL", and the length of the source arm will be referred to as the Source Arm Length, or "SAL". Using the values found in FIG. 17, the value of SAL is 150.0 mm, and the value of the MAL is 2×36.159 mm+48.181 mm=120.50 mm; The magnification, M, is therefore 120.5/150.0=0.8033.

The reflective surfaces comprising interferometer 200, namely secondary mirror surface 216, reference mirror surface 206, and primary mirror surface 210, can and will have subtle manufacturing flaws that result in surface topographies that differ somewhat, and generally uncontrollably, from the ideal or as-designed surface prescription. These surface figure errors can be less than 1.0 μm peak-to-valley, or preferably less than 0.10 μm peak-to-valley. These surface figure errors can cause spurious variations in OPL (optical path length) and OPD (optical path difference which is the difference in optical path length between the measurement and reference arms of interferometer 200) which can limit the accuracy of the displacement measurements of interferometer 200 to approximately the amount of the OPD variation. Further complicating matters is that, since the three reflective surfaces will generally not have perfect rotational symmetry due to the manufacturing errors, then the amount of OPD error will be a strong function of the tilt of test surface 240 with respect to optical axis 230.

Photodetectors 222 (e.g., photodetectors 222A through 222C) are provided and configured to detect shifts in the intensity of reflected test light 270 associated with tilts of test surface 240, similar to the illustrations of FIG. 20A and FIG. 20B, for interferometer 200. Further, knowing a priori, an actual displacement (or OPD) of test surface 240 with respect to interferometer 200, while also knowing, a priori, the tilt of test surface 240 with respect to optical axis 230, allows for the calibration of the OPD of interferometer 200 as a function of displacement and tilt of test surface 240 for a nominally constant displacement of test surface 240. That is, during a calibration process in which the tilt and displacement of test surface 240 is known and controllably varied, the displacement measured by interferometer 200 (which contains the spurious OPD errors caused by the mirror surface errors) is noted as are the outputs of the photodetectors 222 which are associated with and indicative of the tilt of test surface 240 for a given displacement measurement. In this way a calibration table of displacement value as a function of test surface tilt, or alternately a mathematical calibration function that relates surface tilt to a displacement value, can be constructed by way of the outputs of the photodetectors 222.

Interferometer System

Figure 18:
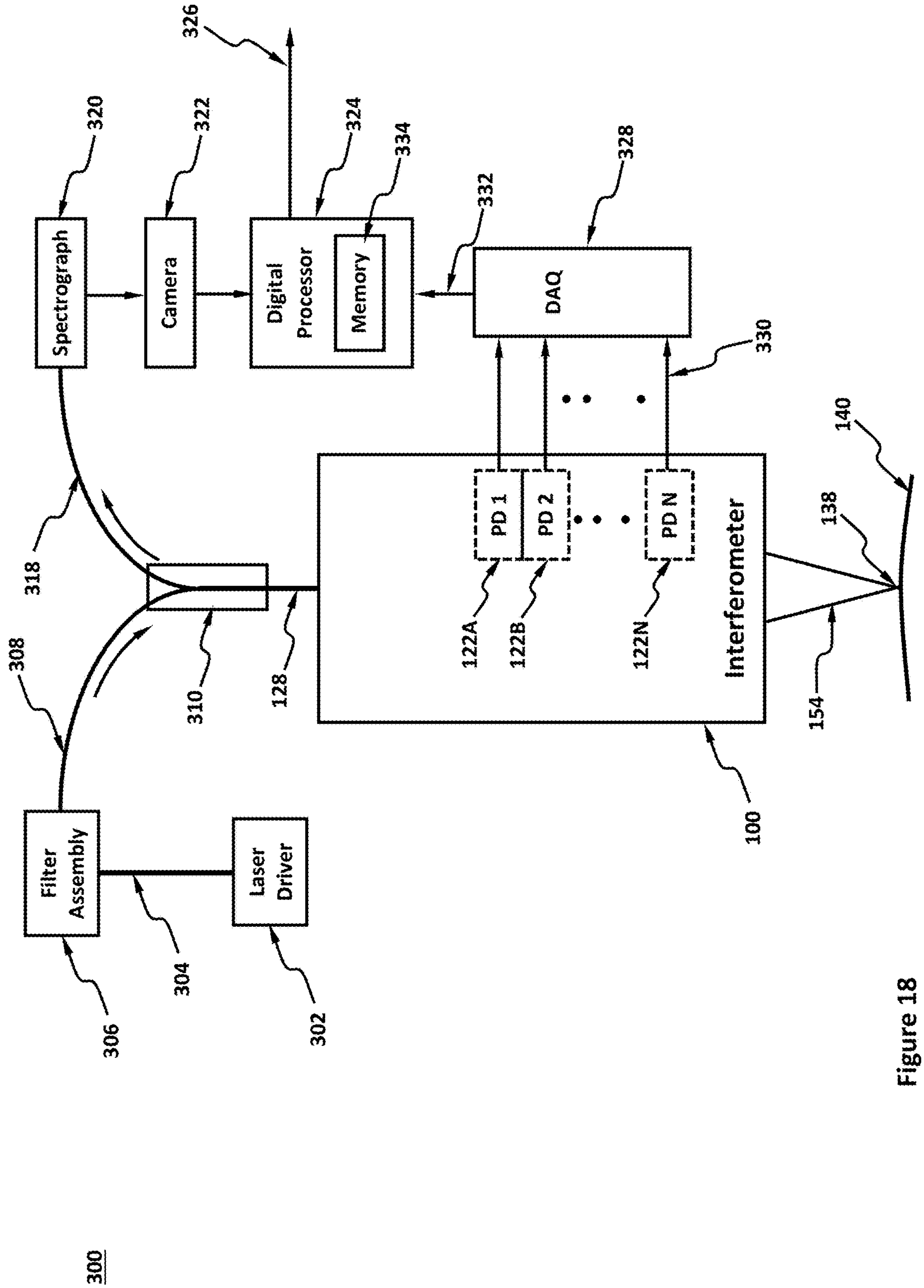
FIG. 18 is block diagram of an interferometer system in accordance with embodiments of the present invention.

In the present invention, either interferometer 100 of Example 1 or interferometer 200 of Example 2 can be incorporated into an interferometer system 300. FIG. 18 shows an interferometer system 300 with the usage of interferometer 100 with the understanding that interferometer 200 that could be used in its place.

As shown in FIG. 18, interferometer system 300 can also include a light source, such as a laser such as laser 304, a laser driver 302, a filter assembly 306, a source fiber optic 308, a fiber optic coupler 310, an output fiber optic 318, a spectrograph 320 which may include a camera 322 or camera 322 can be external to spectrograph 320, a digital processing system 324 having memory 334, a data acquisition (DAQ) sub-system 328 that in turn has inputs coupled to outputs of photodetectors 122, and a system output 326 data line.

Referring more specifically to FIG. 18, the laser driver 302 has an output coupled to a laser 304 whose light output is coupled to an input of filter assembly 306, although other components and/or elements in other configurations may be used. The laser driver 302 and laser 304 together comprise a broadband light source, whose output is through a small-diameter aperture at an end of laser 304, although other types of light sources may be used. In one example, the laser driver 302 and laser 304 are a so-called white-light laser, more technically known as a supercontinuum laser, although other types of white light or other broadband light sources, such as those that utilize LEDs, SLEDs (super-luminescent LEDs) or incandescence by way of example, can be used. Laser 304 can be a fiber laser where an optical fiber is the lasing medium.

In this example, the requirements and characteristics of the light source are: (1) that the output light pass through a small-diameter aperture such as a 5 μm diameter associated with a single-mode fiber; (2) that as much optical flux passes through the output aperture as possible; (3) that the coherence length of the light is greater than or equal to 1 mm, and (4) that the output photon flux is broad-band, although other types and/or numbers of requirements and/or characteristics of the light source may be used in other examples. For example, typically laser 304 is a single-mode fiber and has a core diameter—and exit aperture diameter—of less than 10 μm, and in some examples preferably less than or equal to 5 μm. The optical spectral flux exiting laser 304 in this example should be as great as possible, being at least 100 μW/nm, or in some examples advantageously at least 200 μW/nm, or in other examples advantageously greater than 1 mW/nm. Finally, in this example the spectrum of the light exiting the light source is broadband, and also of a wavelength range that the downstream image sensor of the camera 322 is responsive to. In particular, in this example light in the range of 450 nm to 650 nm is advantageous, while light from 400 nm to 800 nm is even more advantageous, although in other examples other ranges may be preferred such as from 700 nm to 2400 nm.

One of ordinary skill in the art will appreciate that the laws of etendue generally restrict the ability of a small light source to output relatively large spectral flux values into a small angularly envelope. However, in this example a laser driver 302 and a laser 304 comprising a supercontinuum laser can economically meet the desired flux emission values with a small (e.g., 5 μm diameter) aperture as well as the desired wavelength range. A supercontinuum laser often produces significant amounts of light above 800 nm; these wavelengths of light are generally not needed or used by examples of the claimed technology, and if not removed can propagate into interferometer 100 and be absorbed by components or surfaces inside the interferometer 100 thereby generating undesirable heat and internal thermal gradients. Since these internal thermal gradients can cause poor displacement measuring performance, it is desirable to filter these longer wavelengths or otherwise prevent them from entering the interferometer 100.

The filter assembly 306 has an input coupled to an output of laser 304 and an output coupled to source fiber optic 308, although other components and/or elements in other configurations may be used. Filter assembly 306 has provisions for filtering the unwanted wavelengths from the light output from laser 304, although other types of filters may be used. In other examples, the filter assembly 306 may also have provisions for filtering unwanted polarizations from the light output from laser 304 and for ensuring that the polarization passing through the filter assembly 306 and into the source fiber optic 308 is of a known polarization state and orientation, although the filter assembly may have other types and/or numbers of provisions.

The source fiber optic 308 is used to couple the filtered light output by the filter assembly 306 to an input of fiber optic coupler 310. The source fiber optic 308 is in some examples preferably a single-mode fiber, having a core diameter less than 10 μm, or in some examples preferably less than 5 μm, and transmits all wavelengths of light that are used by interferometer 100, such as 400 nm to 800 nm, to the interferometer with minimal attenuation. Additionally, since the light output by the filter assembly 306 can be polarized, the source fiber optic 308 can have polarization-preserving or polarization-maintaining properties. Further, since the laser driver 302 and laser 304 generate heat, in this example the laser driver 302 and laser 304 are placed a sufficient distance from interferometer 100 so the performance of interferometer 100 is not affected by the heat generated by these heat-generating sources. In this example the length of the source fiber optic 308 is at least one meter to provide the sufficient distance, or in other examples at least two meters, provided the extra length of fiber does not significantly attenuate those wavelengths used by interferometer 100 (or interferometer 200).

Fiber optic coupler 310 can be a three-port device that is used to either combine or to split optical signals being transmitted through fiber-optics. In the example embodiment shown in FIG. 18, fiber optic coupler 310 has an input coupled to an output of source fiber optic 308, an output coupled to an input of output fiber optic 318, and a two-way bidirectional (i.e., input and output) port coupled to input/output optical fiber 128. Fiber optic coupler 310 can be a single-mode fiber-optic device and must transmit at least a portion of all wavelengths of light (through all three ports) that are used by interferometer 100 for the displacement-measuring process. A typical device that can be employed for use as fiber optic coupler 310 is the Thorlabs (Newton, NY, USA) TW560R3A1 which is a wide-band, 2×1, single-mode, 50:50 coupler having a 250 nm optical bandwidth centered on 560 nm. Light entering fiber optic coupler 310 from source fiber optic 308 is transmitted by fiber optic coupler 310 into input/output optical fiber 128, and light entering fiber optic coupler 310 from input/output optical fiber 128 is transmitted by fiber optic coupler 310 into output fiber optic 318.

The input/output optical fiber 128 is used to couple the light from filter assembly 306 through fiber optic coupler 310 to an input of interferometer 100 as well as to couple light output by interferometer 100 to fiber optic coupler 310. The input/output optical fiber 128 is in some examples preferably a single-mode fiber, having a core diameter less than 10 μm, or in some examples preferably less than 5 μm, and transmits all wavelengths of light that are used by interferometer 100, such as 400 nm to 800 nm, to (and from) the interferometer 100 with minimal attenuation. Further, since the laser driver 302 and laser 304 generate heat, in this example the laser driver 302 and laser 304 are placed a sufficient distance from interferometer 100 so the performance of interferometer 100 is not affected by these heat generating sources. In this example the length of the input/output optical fiber 128 is at least one meter to provide the sufficient distance, or in other examples at least two meters, provided the additional length does not significantly attenuate any of the wavelengths transmitted by the input/output optical fiber 128.

Continuing with reference to FIG. 18, interferometer system 300 can also include a spectrograph 320. Spectrograph 320 is an optical instrument that is used to spectrally disperse an optical signal into a spectrum of wavelengths, such that the magnitude of the constituent wavelengths within the optical signal can be analyzed. Spectra, such as that illustrated in FIG. 19, produced by spectrograph 320 is coupled to an input of camera 322 that captures imagery of the spectra produced by the spectrograph 320. That is, the output of the spectrograph 320 is an optical signal represented as intensity as a function of wavelength, and an image of this optical signal is subsequently presented to camera 322 which captures the spectral image, converts the image to an electronic format, and transmits the electronically formatted spectral image to digital processing system 324 for processing. The spectrograph 320 nominally has the same (or broader) spectral bandwidth of the interferometer 100, such as the 400 nm to 800 nm spectral range cited earlier. The spectral resolution of spectrograph 320 in this example is fine enough that the individual interference fringes within the spectral interferogram can be resolved. Therefore, the spectral resolution of spectrograph 320 can be better than 100 pm (100 picometers), or in some examples preferably less than 50 pm, or in other examples better than 20 pm. One such spectrograph that meets these requirements is the Hyperfine Spectrometer from LightMachinery Inc., Ottawa, Ontario, Canada.

The camera 322 captures an image of the optical signal or spectrum created by the spectrograph 320 and converts the image to an electronic format. In one example, the camera 322 is a line camera, wherein the image sensor of the camera 322 comprises a row of pixels arranged linearly, and onto which a spectral image is projected by spectrograph 320. In such a case, there can be between 256 and 16,384 pixels in the image sensor whose length can be up to 100 mm, and the imaging frame rate can be up to 200,000 captured images per second. More preferably, in this example the spectrograph 320 and camera 322 may be operative with two-dimensional spectral images. In this two-dimensional example, the camera 322 can have an image sensor whose pixels are arranged in a two-dimensional array wherein the pixel count can be from 640×480 pixels up to 10,000×5000 pixels, the size of the image sensor can be from 3.2 mm×2.4 mm up to 50 mm×25 mm, and the frame rate can be between 10 images/second up to 50,000 images/second. The camera 322 in this example is preferably a monochrome camera (as opposed to color) and has a gray-scale bit depth of from 8 bits up to 20 bits, although other types of cameras may be used. The output of camera 322 is coupled to an input of a digital processing system 324.

The digital processing system 324 may include one or more processors, a memory 334, and/or a communication interface, which are coupled together by a bus or other communication link, although the digital processing system 324 can include other types and/or numbers of elements in other configurations and also other types of processing systems or other computing devices may be used. The processor(s) of digital processing system 324 may execute programmed instructions stored in memory 334 for any number of the functions described and illustrated herein. The processor(s) of digital processing system 324 may include one or more CPUs or general-purpose processors with one or more processing cores, for example, although other types of processor(s) can also be used although the digital processing system 324 may comprise other types and/or numbers of components and/or other elements in other configurations.

By way of example only, the digital processing system 324 also could be a conventional microprocessor with an external memory or the digital processing system 324 can be a microcontroller with all memory located onboard. In another example, the digital processing system 324 could be a digital signal processor (DSP) integrated circuit, which is a microcomputer that has been optimized for digital signal processing applications, including centroid computations, regression, and curve-fitting. In yet another example, the digital processing system 324 can be a graphical processing unit (GPU) integrated circuit, which is a microcomputer that has been optimized for parallel-processing applications. The digital processing system 324 can be as simple as a sixteen-bit integer device for low-cost applications or the digital processing system 324 can be a thirty-two bit or sixty-four bit or higher floating-point device or system for higher performance when cost is not an issue. Also, by way of example only, the digital processing system 324 can be an FPGA (Field-programmable gate array) or a CPLD (complex programmable logic device) which are attractive for use in examples of this technology owing to their compact and cost-effective hardware implementations.

The memory 334 of the digital processing system 324 stores these programmed instructions for one or more aspects of the present technology as described and illustrated herein, such as for generating spectral content values of light output by interferometer 100 and for determining displacement or some other property of test surface 140 or a test object as described and illustrated herein for execution by the processing unit by way of example, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory.

Examples of one or more portions of the claimed technology as illustrated and described by way of the examples herein may also be embodied as one or more non-transitory computer readable media having instructions stored thereon for one or more aspects of the present technology, such as the memory of the digital processing system 324. The instructions in some examples include executable code that, when executed by one or more processors, such as the processor(s) of the digital processing system 324, cause the one or more processors to carry out steps necessary to implement the methods of the examples of this technology that are described and illustrated herein.

A communication interface or bus associated with digital processing system 324 operatively couples and communicates to the spectrograph 320, the camera 322, and the DAQ 328 by a communication system, although other types and/or numbers of communication systems with other types and/or numbers of connections and/or configurations to other devices and/or elements can also be used.

As mentioned earlier a plurality of photodetectors, such as photodetectors 122A through 122E coupled to the arms 120A through 120E of secondary spider support structure 120, are provided to detect a portion of the reflected test light 170 reflected from test surface 140. The output of a photodetector 122A through 122E is an electronic signal which is output to an input of data acquisition system (DAQ) 328 through photodetector output lines 330. DAQ 328 can comprise an analog to digital converter (A/D or ADC) that converts the electronic signal present on the photodetector output lines 330 to a digital format and outputs the digital data to the digital processing system 324 through DAQ output 332. In this example, the DAQ's 328 analog-to-digital converter (ADC) sub-system can have 16 bits of resolution, although 20 bits of resolution is preferred. Further, if, as shown in the example in FIG. 8 there are five photodetectors 122A through 122E, for example, having five individual output lines (e.g., 330A, 330B, 330C, 330D, and 330E, not individually shown) then the DAQ 328 can have five individual ADC channels accordingly, or, less preferably, the five lines can be multiplexed through a single ADC device within DAQ 328.

Interferometer system output 326 is an electronic signal line that couples an output of digital processing system 324 to an input of a downstream electronic device such as a client computer or a display (not shown). As such interferometer system output 326 can be a serial bus such as a USB or SPI bus, for inter-computer communications, or HDMI in the case where the downstream electronic device is a display. The data communicated through interferometer system output 326 bus can be the displacement measured by interferometer system 300, the topography of test surface 140, as well as other data, such as meta-data (such as, for example, the date and time of the measurement, the speed of the measurement, details about the object having test surface 32 being measured, etc.) about the displacement measurement process.

An example of a method for measuring displacement with the interferometer system 300 will now be described with reference to FIG. 18. As shown in FIG. 18, a light source comprising the laser driver 302 and laser 304 outputs broadband light from laser 304 which then enters filter assembly 306. In this example the filter assembly 306 removes unwanted wavelengths from the broadband light, such as those from 800 nm to 2400 nm, although the filter assembly could provide other types of filtering. The filtered light that exits the filter assembly 306 is transmitted through source fiber optic 308 to an input port of fiber optic coupler 310. A large portion of the filtered light that enters fiber optic coupler 310 is transmitted through fiber optic coupler 310 and passes into through input/output optical fiber 128 whereupon the filtered light enters the source arm of interferometer 100.

Light that exits interferometer 100 (or similarly, interferometer 200) exits through input/output optical fiber 128 and is transmitted to fiber optic coupler 310 and a portion of which is routed into output fiber optic 318 whereupon it is transmitted to, and enters, spectrograph 320 as seen in FIG. 18. Note that substantially all of the wavelengths of light propagating through the reference arm of interferometer 100 and present in the light output by the filter assembly 306 are also present in the light entering input/output optical fiber 128 from the output arm of interferometer 100. Further, this broadband output light that enters input/output optical fiber 128 propagates through input/output optical fiber 128, fiber optic coupler 310, and output fiber optic 318 to spectrograph 320. Similarly, the wavelengths of light present in the light output by the filter assembly 306 are also present in the light entering input/output optical fiber 128 from the measurement arm (i.e., from the measurement spot 138 on test surface 140) of interferometer 100. Further, this broadband output measurement light that enters input/output optical fiber 128 propagates through input/output optical fiber 128 to spectrograph 320 (through fiber optic coupler 310, and output fiber optic 318).

The spectrograph 320 spectrally disperses the wavelengths of the broadband reference light and projects the spectrum onto the image sensor of the camera 322. This reference light is then available to produce interference fringes on the image sensor of the camera 322 with any light from the measurement arm of interferometer 100 that is concurrently projected onto the image sensor. The spectrograph 320 also spectrally disperses the received measurement light and projects the spectrum onto the image sensor of the camera 322. This dispersed measurement light interferes with the dispersed reference light and produces interference fringes on the image sensor of the camera 322.

In this example, another requirement to produce high contrast interference fringes is that the two interfering beams are coherent with one another, which means that the optical path difference (OPD) between the lengths of the propagation paths of the two interfering beams (namely the measurement arm path and the reference arm path) is less than the coherence length of the light being interfered. Indeed, it is the OPD information that contains information about the displacement between interferometer 100 and test surface 140 at measurement spot 138. The OPD is equal to the difference of the optical path length between the reference arm and the measurement arm, i.e., $OPD=OPL_{ref}-OPL_{meas}$ (or equivalently, $OPD=OPL_{meas}-OPL_{ref}$).

Figure 19:
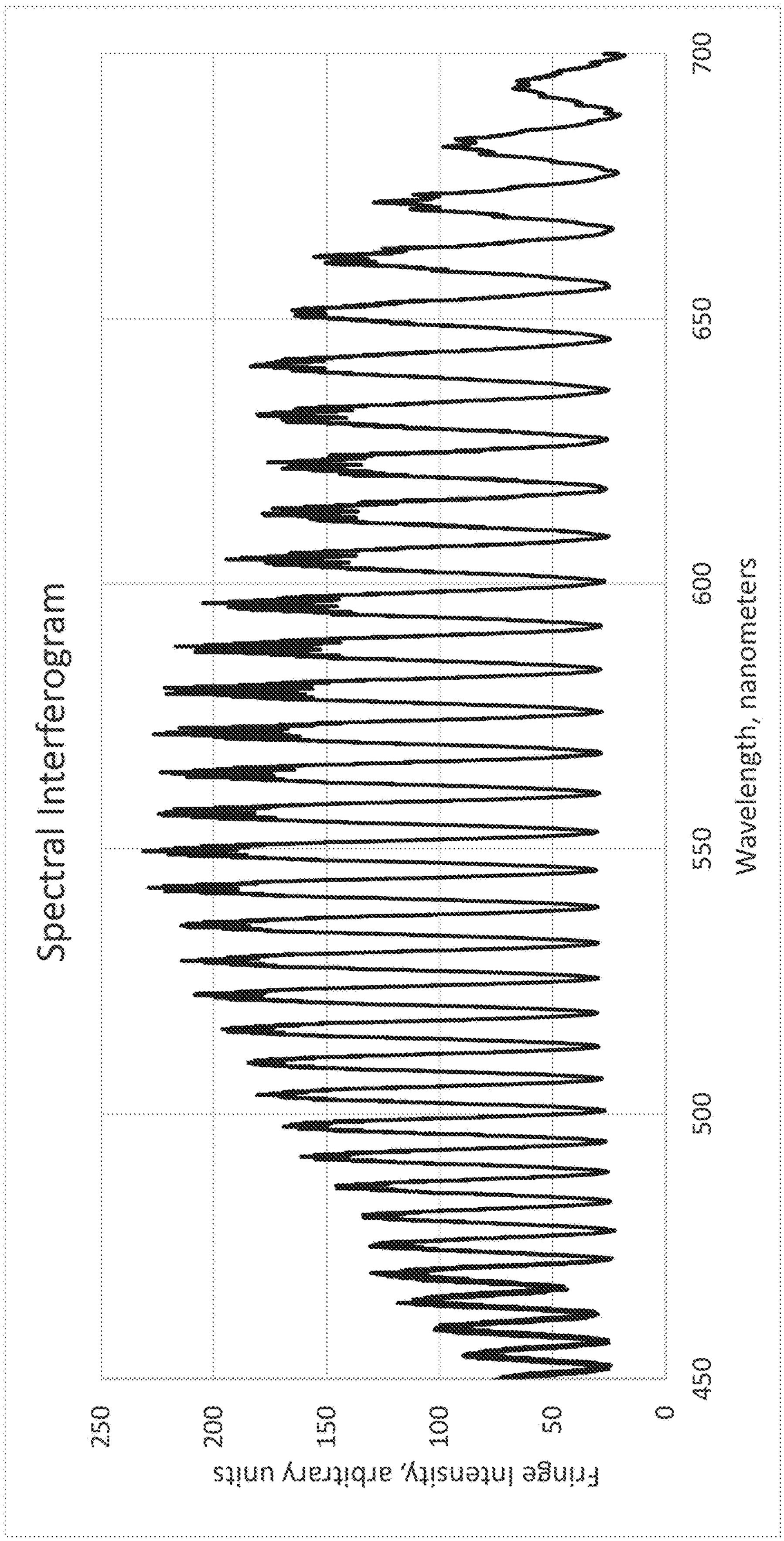
FIG. 19 is an example of a spectral interferogram output by the spectrograph in accordance with embodiments of the present invention.

The optical path length of the reference arm, $OPL_{ref}$, is equal to twice the sum of the geometrical distance from the aperture of input/output optical fiber 128 to secondary mirror surface 116 and the distance from secondary mirror surface 116 to reference mirror surface 106 along optical axis 130, and is substantially constant. The optical path length of the measurement arm, $OPL_{meas}$, is equal to twice the sum of the geometrical distance from the aperture of input/output optical fiber 128 to secondary mirror surface 116 and the distance from secondary mirror surface 116 to primary mirror surface 110 and the distance from primary mirror surface 110 to test surface 140 along the optical axis 130, and is not substantially constant but varies in accordance with the elevation of test surface 140 at the location of measurement spot 138 as interferometer 100 is scanned over test surface 140. Indeed, it is the changing value of the quantity $OPL_{meas}$ which is to be determined, which can be found from the interference equation:

$$I_t = I_{meas} + I_{ref} + 2\sqrt{I_{meas} I_{ref}} \cos\left[\frac{2\pi(OPL_{ref} - OPL_{meas})}{\lambda}\right] \quad \text{Equation 1}$$

where $I_t$ is the total interference value, $I_{meas}$ is the intensity of the light from the measurement arm, $I_{ref}$ is the intensity of the light from the reference arm, and λ is the wavelength of the light being interfered. FIG. 19 is an example of a spectral interferogram captured in accordance with embodiments of the present invention as disclosed herein. Note the frequency of the fringes within the interferogram of FIG. 19 changes in accordance with wavelength in accordance with Equation 1 in which the wavelength, λ, is present in the denominator of the cosine term. Further, the OPD, which is equal to $OPL_{ref}-OPL_{meas}$, is held substantially constant during the short measurement period in which the interferogram of FIG. 19 was captured, and it is this term (in the numerator of the cosine term of Equation 1) which determines the frequency of the fringes at particular values of wavelength, λ.

It is the spectral interference pattern described by Equation 1 that is captured by camera 322. Further, the spectral interference pattern captured by camera 322 is digitized by camera 322 and the digital representation of the spectral interference pattern is output to digital processing system 324. Software executing within digital processing system 324 then mathematically analyzes the captured and digitized spectral interference pattern and determines a value for OPD from which a value of $OPL_{meas}$ can be determined. Note that for interference fringes to form the absolute value of OPD must be greater than 0.0. Further, the absolute value of the OPD must be less than the coherence length of laser 304; the coherence length can be less than or equal to 5.0 mm, or, in some cases, up to 10 mm or even 100 mm.

The ability of interferometer system 300 to measure $OPL_{meas}$, changes in $OPL_{meas}$, displacements, and the topography of test surface 140 can be very good. For example, if the spectral bandwidth is 200 nm wide (i.e., if λ of Equation 1 spans 200 nm), and spectrograph 320 has a resolution of 0.005 nanometers, then some 200/0.005=40,000 sample points will be available across the digitized spectral interference pattern, and the software executing within digital processing system 324 can then repeatably determine $OPL_{meas}$ to better than 1 nm (one standard deviation), or, when the SNR (Signal to Noise Ratio) of the captured spectral interference pattern exceeds 25:1 the $OPL_{meas}$ determination can be better than 0.10 nm (one standard deviation). The displacement measuring rate of interferometer system 300 can be as fast as the frame rate of camera 322, outputting over 1000 displacement measurements per second, or even up to 50,000 displacement measurements/second when camera 322 is a two-dimensional camera or even up to 200,000 displacement measurements/second when camera 322 is a linear line-camera.

In the absence of systematic errors of interferometer 100, the repeatability of a determined value of $OPL_{meas}$ (especially when the test surface is tilted between measurements) can be used as a proxy for the accuracy of interferometer system 100. However, one source of systematic error is caused by primary mirror surface 110. If primary mirror surface 110 is perfect and has no surface figure errors and is perfectly aligned with respect to optical axis 130, then primary mirror surface 110 will not impart any systematic errors to the displacement measurement process. However, because primary mirror surface 110 cannot be manufactured perfectly, nor can it be installed and aligned perfectly in interferometer 100, then primary mirror surface 110 can introduce systematic errors into the displacement-measurement process. One way primary mirror surface 110 can cause systematic errors is that, given a constant displacement of test surface 140, a different tilt of test surface 140 will cause the reflected test light 170 to be incident on a different portion of primary mirror surface 110, and because of imperfections in the topography or surface figure of primary mirror surface 110 will cause spurious changes in the value of $OPL_{meas}$. That is, different values of test surface 140 tilt can cause erroneous changes in $OPL_{meas}$ even when the actual displacement to test surface 140 at measurement spot 138 is kept substantially constant. This measurement error is similar to so-called retrace errors commonly found in the art in reference to areal interferometry in which light rays reflected from a test surface trace a slightly different path than expected (due to interactions between tilts in the test surface and surface figure and material homogeneity errors in the optics of the interferometer) in the interferometer along the optical path to the point where the interference fringes are created, and the corresponding errors in the optical path length within the measurement arm creates errors in the measurement of the topography of the test surface. Unlike in areal interferometry, however, in which retrace errors cannot be corrected, a method to characterize, calibrate, and substantially correct the retrace errors present in interferometer 100 is possible and is described below.

One way to correct the retrace problems of interferometer 100 is by calibrating or characterizing the spurious erroneous changes in $OPL_{meas}$ with changes in the tilt of test surface 140 at measurement spot 138. The calibration can be accomplished by keeping the displacement substantially constant, intentionally tilting test surface 140 (e.g., by carefully rotating test surface 140 about measurement spot 138), and noting the value, or change in value, of $OPL_{meas}$ with the amount and direction of the tilt of test surface 140. Then during the process of measuring the topography of test surface 140, any errors in $OPL_{meas}$ caused by (localized or bulk) tilts of test surface 140 can be known and subtracted from the determined value of $OPL_{meas}$. This calibration and characterization process requires information about the amount and direction of the tilt of test surface 140; the information can be provided by the photodetectors 122. For example, with reference to FIG. 20B, the direction of reflected test light 170T is determined by the amount and direction of tilt of test surface 140 at measurement spot 138, and the amount of reflected measurement light incident on each and every one of photodetectors 122A through 122E in turn is also directly dependent on the amount and direction of tilt of test surface 140.

During the surface tilt calibration and characterization process for retrace error correction, intensity data of reflected test light 170T on each of the photodetectors 122A through 122E is output by photodetector output lines 230A through 230E to DAQ 228 which then digitizes the data output by photodetectors 122A through 122E and transmits the digitized photodetector output data to digital processing system 224 through DAQ output 232. Software executing on digital processing system 224 can then associate data from photodetectors 122A through 122E with a measured erroneous change in $OPL_{meas}$. Importantly, during the calibration process, test surface 140 is intentionally tipped or tilted through the entire operational surface-tilt envelope of interferometer 100, the envelope can be up to ±10.0° of rotation about the X and Y axes, or in this example preferably up to ±20.0° of rotation about the X and Y axes, while maintaining a constant displacement of test surface 140 at measurement spot 138. For every value of intentionally-induced tilt of test surface 140 the values of the output of each of the photodetectors 122A through 122E and $OPL_{meas}$ are determined and stored in memory of digital processor 124. Then, when measuring and determining the topography of an unknown test surface, which will generally have unknown and/or unanticipated surface tilts, for a given surface displacement measurement the value of the photodetectors 122A through 122E can be determined, its associated $OPL_{meas}$ error can be recalled from memory of digital processor 124, and the associated $OPL_{meas}$ error can be subtracted from the value of $OPL_{meas}$ determined during the measurement process thereby removing systemic retrace errors caused by, for example, imperfections in the optics of interferometer 100 (especially primary mirror surface 110). Alternately, when measuring and determining the topography of an unknown test surface, the ratio of the values of the photodetectors 122A through 122E can be determined, an associated $OPL_{meas}$ error can be recalled from memory of digital processor 124, and the associated $OPL_{meas}$ error can be subtracted from the value of $OPL_{meas}$ determined during the measurement process.

Again, these systemic errors caused by imperfections in the interferometer's optics interacting with a tilted test surface are akin to so-called retrace errors commonly found, and generally not corrected, in areal type interferometers. The calibration process described above for removing test-surface-tilt-induced-errors from the process of measuring the topography of test surface 140 is a key benefit of the present invention.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, such as arrows in the diagrams therefore, is not intended to limit the claimed processes to any order or direction of travel of signals or other data and/or information except as may be specified in the claims. Accordingly, the invention is limited only by the following claims and equivalents thereto.

What is claimed is:

1. An interferometric optical probe system comprising:

a plurality of reflective optical elements having rotational symmetry and optical power and which are substantially centered on an optical axis;

a reference arm comprising at least a concave mirror substantially centered on the optical axis as one of the reflective optical elements and at least one other of the reflective optical elements; and a measurement arm comprising at least two of the reflective optical elements;

wherein at least one of the reflective optical elements for the reference arm and the measurement arm is the same.

2. The system as set forth in claim 1 further comprising:

at least one of a housing or a spacer coupled to at least one of the reflective optical elements.

3. The system as set forth in claim 2 further comprising a bonding mixture comprising one of at least sodium hydroxide or sodium silicate that couples the at least one of the reflective optical elements to the at least one of a housing or spacer.

4. The system as set forth in claim 1 wherein the at least two reflective optical elements of the reference arm are composed of a material having a CTE of less than 10 PPB/degree C.

5. The system as set forth in claim 1 wherein at least one of the reflective optical elements of the reference arm have a spherical, elliptical, parabolic, or hyperbolic prescription.

6. The system as set forth in claim 1 wherein at least one of the reflective optical elements of the measurement arm have a spherical, elliptical, parabolic, or hyperbolic prescription.

7. The system as set forth in claim 2 further comprising:

at least one spider support structure coupled to the housing, wherein one of the reflective optical elements is coupled to the at least one spider support structure.

8. The system as set forth in claim 7 further comprising:

a plurality of light detecting elements positioned on a lower edge of vanes of the at least one spider support structure to capture light to detect a tilt of a test surface with respect to the optical axis.

9. The system as set forth in claim 8 further comprising:

a broadband light source coupled to a fiber optic positioned to transmit broadband light from the broadband light source along the optical axis.

10. The system as set forth in claim 9 wherein the fiber optic is rigidly positioned inside the housing.

11. The system as set forth in claim 8 further comprising:

a computing device coupled to the light detecting elements and comprising memory comprising programmed instructions stored thereon and one or more processors configured to execute the stored programmed instructions to:

detect the tilt of the test surface from the captured light by the light detecting elements; and determining a systemic error based on the detected tilt.

12. The system as set forth in claim 11 wherein the programmed instructions further comprise stored programmed instructions to:

determine a measurement of an object with the reference arm, the measurement arm, and the transmitted light; and subtract the determined systemic error from the determined measurement.

13. The system as set forth in claim 1 further comprising:

a plurality of light detecting elements positioned on a lower surface of one of the reflective optical elements to capture light to detect a tilt of a test surface with respect to the optical axis.

14. The system as set forth in claim 13 further comprising:

a computing device coupled to the light detecting elements and comprising memory comprising programmed instructions stored thereon and one or more processors configured to execute the stored programmed instructions to:

detect the tilt of the test surface from the captured light by the light detecting elements; and determining a systemic error based on the detected tilt.

15. The system as set forth in claim 14 wherein the programmed instructions further comprise stored programmed instructions to:

determine a measurement of an object with the reference arm, the measurement arm, and the transmitted light; and subtract the determined systemic error from the determined measurement.

16. A method of making an interferometric optical probe system, the method comprising:

providing a plurality of reflective optical elements having rotational symmetry and optical power and which are substantially centered on an optical axis;

forming a reference arm comprising at least a concave mirror substantially centered on the optical axis as one of the reflective optical elements and at least one other of the reflective optical elements; and forming a measurement arm comprising at least two of the reflective optical elements;

wherein at least one of the reflective optical elements for the reference arm and the measurement arm is the same.

17. The method as set forth in claim 16 further comprising:

coupling at least one of the reflective optical elements to a housing or a spacer.

18. The method as set forth in claim 17 further comprising:

coupling the at least one of the reflective optical elements of the reference arm to the housing with a bonding mixture comprising one of at least sodium hydroxide or sodium silicate.

19. The method as set forth in claim 16 wherein the at least two reflective optical elements of the reference arm are composed of a low-CTE material.

20. The method as set forth in claim 16 wherein at least one of the reflective optical elements of the reference arm have a spherical, elliptical, parabolic, or hyperbolic prescription.

21. The method as set forth in claim 16 wherein at least one of the reflective optical elements of the measurement arm have a spherical, elliptical, parabolic, or hyperbolic prescription.

22. The method as set forth in claim 16 further comprises:

coupling at least one spider support structure to the housing; and coupling one of the reflective optical elements to the at least one spider support structure.

23. The method as set forth in claim 22 further comprising:

positioning a plurality of light detecting elements on a lower edge of vanes of the at least one spider support structure to capture light to detect a tilt of a test surface with respect to the optical axis.

24. The method as set forth in claim 23 further comprising:

coupling a broadband light source to a fiber optic positioned to transmit broadband light from the broadband light source along the optical axis.

25. The method as set forth in claim 24 wherein the fiber optic is rigidly positioned inside the housing.

26. The method as set forth in claim 23 further comprising:

providing a computing device coupled to the light detecting elements and comprising memory comprising programmed instructions stored thereon and one or more processors configured to execute the stored programmed instructions to:

detect the tilt of the test surface from the captured light by the light detecting elements; and determine a systemic error based on the detected tilt.

27. The method as set forth in claim 26 wherein the programmed instructions further comprise stored programmed instructions to:

determine a measurement of an object with the reference arm, the measurement arm, and the transmitted light; and subtract the determined systemic error from the determined measurement.

28. The method as set forth in claim 16 further comprising:

positioning a plurality of light detecting elements on a lower surface of one of the reflective optical elements to capture light to detect a tilt of a test surface with respect to the optical axis.

29. The method as set forth in claim 28 further comprising:

a computing device coupled to the light detecting elements and comprising memory comprising programmed instructions stored thereon and one or more processors configured to execute the stored programmed instructions to:

detect the tilt of the test surface from the captured light by the light detecting elements; and determining a systemic error based on the detected tilt.

30. The method as set forth in claim 29 wherein the programmed instructions further comprise stored programmed instructions to:

determine a measurement of an object with the reference arm, the measurement arm, and the transmitted light; and subtract the determined systemic error from the determined measurement.

* * * * *